US010681730B2

United States Patent
Mukherjee et al.

(10) Patent No.: US 10,681,730 B2
(45) Date of Patent: Jun. 9, 2020

(54) CONTENTION WINDOW ADAPTATION IN MULTI-CARRIER LISTEN-BEFORE-TALK PROTOCOLS

(71) Applicant: Telefonaktiebolaget LM Ericsson (Publ), Stockholm (SE)

(72) Inventors: Amitav Mukherjee, Fremont, CA (US); Jung-Fu Cheng, Fremont, CA (US); Sorour Falahati, Stockholm (SE); Laetitia Falconetti, Solna (SE); Du Ho Kang, Sollentuna (SE); Reem Karaki, Aachen (DE); Havish Koorapaty, Saratoga, CA (US); Daniel Larsson, Stockholm (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 243 days.

(21) Appl. No.: 15/300,345

(22) PCT Filed: Jul. 8, 2016

(86) PCT No.: PCT/SE2016/050708
§ 371 (c)(1),
(2) Date: Sep. 29, 2016

(87) PCT Pub. No.: WO2017/026937
PCT Pub. Date: Feb. 16, 2017

(65) Prior Publication Data
US 2017/0188387 A1    Jun. 29, 2017

Related U.S. Application Data

(60) Provisional application No. 62/204,868, filed on Aug. 13, 2015.

(51) Int. Cl.
H04W 74/08    (2009.01)
H04L 1/18    (2006.01)
(Continued)

(52) U.S. Cl.
CPC ....... *H04W 74/0808* (2013.01); *H04L 1/1812* (2013.01); *H04L 5/0055* (2013.01); *H04W 74/002* (2013.01)

(58) Field of Classification Search
CPC ... H04L 1/1812; H04L 5/0055; H04L 1/1825; H04W 74/0808; H04W 74/002
See application file for complete search history.

(56) References Cited

U.S. PATENT DOCUMENTS 9,509,465 B2 * 11/2016 Park ................. H04W 74/0816
2010/0142465 A1 * 6/2010 Medepalli ........... H04W 72/085
370/329

(Continued)

OTHER PUBLICATIONS

Orfanos, G., "Development and Performance Evaluation of an Adaptive MAC Protocol for MC-CDMA Wireless LANs with QoS Support", 2006, Doctorate Dissertation, University of Rheinisch-Westfalischen, Aachen, Germany, ISBN: 3-86130-931-9, pp. 243 (Year: 2006).*

(Continued)

*Primary Examiner* — Un C Cho
*Assistant Examiner* — Shah M Rahman
(74) *Attorney, Agent, or Firm* — Christopher & Weisberg, P.A.

(57) ABSTRACT

A method and network node for adaptation of contention windows in a multicarrier wireless communication system implementing a listen-before-talk protocol are disclosed. According to one aspect, a method includes determining at least one component carrier (CC), of multiple CCs to serve as a backoff channel. The method further includes performing a listen-before-talk procedure on the at least one CC serving as a backoff channel. The listen-before-talk procedure includes sensing for each backoff channel whether a clear channel exists during a backoff period drawn from a contention window (CW). The LBT procedure also includes (Continued)

deferring transmitting on a CC for which the sensing does not indicate that a clear channel exists. The LBT procedure also includes transmitting on a CC for which the sensing indicates a clear channel exists. The method also includes determining a size of the CW based on at least one transmission feedback value.

21 Claims, 15 Drawing Sheets

(51) Int. Cl.
    *H04L 5/00*           (2006.01)
    *H04W 74/00*        (2009.01)

(56) References Cited

U.S. PATENT DOCUMENTS

| | | | |
|---|---|---|---|
| 2011/0096747 A1 | 4/2011 | Seok | |
| 2012/0002567 A1* | 1/2012 | Sun | H04W 28/16 370/252 |
| 2012/0099491 A1* | 4/2012 | Lee | H04L 1/0015 370/280 |
| 2014/0010089 A1* | 1/2014 | Cai | H04W 48/16 370/241 |
| 2015/0131536 A1* | 5/2015 | Kaur | H04L 5/001 370/329 |
| 2015/0373582 A1* | 12/2015 | Valliappan | H04W 28/08 370/329 |
| 2016/0007368 A1* | 1/2016 | Moon | H04W 56/00 370/329 |
| 2016/0135055 A1* | 5/2016 | Bhorkar | H04W 16/14 455/454 |
| 2016/0270100 A1* | 9/2016 | Ng | H04L 1/1887 |
| 2016/0278088 A1* | 9/2016 | Cheng | H04W 72/0453 |
| 2016/0338054 A1* | 11/2016 | Oh | H04W 74/0841 |
| 2017/0019909 A1* | 1/2017 | Si | H04L 47/27 |
| 2017/0034831 A1* | 2/2017 | Yerramalli | H04W 72/08 |
| 2017/0048860 A1* | 2/2017 | Damnjanovic | H04W 74/0808 |
| 2017/0048880 A1* | 2/2017 | Anderson | H04W 72/1226 |
| 2018/0139779 A1* | 5/2018 | Kim | H04W 28/0289 |
| 2018/0175975 A1* | 6/2018 | Um | H04L 1/1816 |
| 2018/0184459 A1* | 6/2018 | Kim | H04L 5/00 |
| 2018/0199376 A1* | 7/2018 | Kim | H04L 1/0026 |
| 2018/0220459 A1* | 8/2018 | Park | H04W 16/14 |

OTHER PUBLICATIONS

Ericsson, "R1-151996 Discussion on LBT Protocols", Apr. 20th-24th, 2015, 3GPP TSG RAN WG1 Meeting #80bis, pp. 9 (Year: 2015).*
Ng et al., "Method and Apparatus for Adaptive Control of Contention Window in LAA", Jul. 16, 2015, U.S. Appl. No. 62/193,333, pp. 19 (Year: 2015).*
Ng et al., "Method and Apparatus for LTE Multi-Carrier operatons on Unlicensed Spectrum", Jul. 31, 2015, U.S. Appl. No. 61/199,368, pp. 28 (Year: 2015).*
Georgios Orfanos, et al., Proceedings of 14th 1st Mobile & Wireless Communications Summit, Dresden, Germany, Title: "A new Distributed Coordination Function for W-LANs with Multiple Channel Structure," pp. 1-5, XP002756497, Jun. 19, 2005 consisting of 5-pages.
Georgios Orfanos, Doctorate Dissertation, University of Rheinisch Westfilischen Aachen, Germany, Title: "Development and Performance Evaluation of an Adaptive MAC Protocol for MC-CDMA Wireless LANs with QoS Support," vol. 52, pp. FP-xii, 1-10, 121-132, XP002761509, ISBN: 3-86130-931-9, Jun. 19, 2006 consisting of 32-pages.
3GPP TS 36.331 V11.5.0 (Sep. 2013) 3rd Generation Partnership Project; Technical Specification Group Radio Access Network; Evolved Universal Terrestrial Radio Access (E-UTRA); Radio Resource Control (RRC); Protocol Specification (Release 11) Sep. 19, 2013 consisting of 347-pages.
3GPP TS 36.211 V11.4.0 3rd Generation Partnership Project; Technical Specification Group Radio Access Network; Evolved Universal Terrestrial Radio Access (E-UTRA); Physical Channels and Modulation (Release 11) Sep. 20, 2013 consisting of 120-pages.
3GPP TS 36.213 V11.4.0 (Sep. 2013) 3rd Generation Partnership Project; Technical Specification Group Radio Access Network; Evolved Universal Terrestrial Radio Access (E-UTRA); Physical Layer Procedures (Release 11) Sep. 20, 2013 consisting of 182-pages.
International Search Report and Written Opinion dated Sep. 19, 2016 for International Application No. PCT/SE2016/050708, International Filing Date: Jul. 8, 2016 consisting of 9-pages.
Japanese Office Action and English Translation for Japanese Patent Application No. 2018-506871 dated Mar. 1, 2019; consisting of 5-pages.
3GPP TSG RAN WG1 #81 R1-152784; Title: Multi-carrier LBT operation for LAA; Agenda Item: 6.2.4.3; Source: Qualcomm Incorporated; Document for: Discussion and Decision; Location and Date: Fukuoka, Japan May 25th-29th, 2015, consisting of 8-pages.
3GPP TSG RAN WG1 Ad-hoc Meeting R1-150978; Title: Description of candidate LBT schemes; Agenda Item: 2.2; Source: Huawei, Hisilicon; Document for: Discussion/Decision; Location and Date: Paris, France, Mar. 24th-26th, 2015, consisting of 11-pages.
Korean Summary of the Notice of Preliminary Rejection and English Translation dated Apr. 18, 2019 for Korean Patent Application No. 2018-7006210; consisting of 6-pages.
Georgios Orfanos, "Development and Performance Evaluation of an Adaptive MAC Protocol for MC-CDMA Wireless LANs with QoS Support", ABMT, pp. 1-228; Dated: Jun. 19, 2006, consisting of 243-pages.
3GPP TSG RAN WG1 meeting #81 R1-152732; Title: DL LBT operation with variable contention window size; Agenda Item: 6.2.4.3; Source: LG Electronics; Document for: Discussion and decision; Location and Date: Fukuoka, Japan, May 25-29, 2015, consisting of 6-pages.
Notice of Preliminary Rejection and English translation dated Oct. 25, 2019 for Korean Patent Application No. 2018-7006210; consisting of 7-pages.

\* cited by examiner

CONTENTION WINDOW ADAPTATION IN MULTI-CARRIER LISTEN-BEFORE-TALK PROTOCOLS

CROSS-REFERENCE TO RELATED APPLICATIONS

This application is a Submission Under 35 U.S.C. § 371 for U.S. National Stage Patent Application of International Application Number: PCT/SE2016/050708, filed Jul. 8, 2016 entitled "CONTENTION WINDOW ADAPTATION IN MULTI-CARRIER LISTEN-BEFORE-TALK PROTOCOLS," which claims priority to U.S. Provisional Application No. 62/204,868, filed Aug. 13, 2015, entitled "CONTENTION WINDOW ADAPTATION IN MULTI-CARRIER LBT PROTOCOLS," the entirety of both which are incorporated herein by reference.

TECHNICAL FIELD

The disclosure relates to wireless communication, and in particular to adaptation of contention windows for multi-carrier listen-before-talk (LBT) protocols.

BACKGROUND

The ongoing third generation partnership project (3GPP) Rel-13 study item, "Licensed-Assisted Access" (LAA), intends to allow long term evolution (LTE) equipment to also operate in the unlicensed 5 giga-Hertz (GHz) radio spectrum. The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

Regulatory requirements, however, may not permit transmissions in the unlicensed spectrum without prior channel sensing. Since the unlicensed spectrum must be shared with other radios of similar or dissimilar wireless technologies, a so called listen-before-talk (LBT) method needs to be applied. LBT involves sensing the medium for a pre-defined minimum amount of time and backing off if the channel is busy. Today the unlicensed 5 GHz spectrum is mainly used by equipment implementing the Institute of Electrical and Electronic Engineers (IEEE) 802.11 Wireless Local Area Network (WLAN) standard. This standard is also known under its marketing brand, "Wi-Fi."

The choice of parameters used in the LBT procedure prior to accessing the channel has a major impact on inter-radio access technology (RAT) coexistence and throughput. Of particular relevance is the method of adapting the size of contention windows in different random access methods, which determines how long nodes have to wait before attempting to transmit on the medium.

LTE uses orthogonal frequency division multiplex (OFDM) in the downlink and discrete Fourier transform (DFT)-spread OFDM (also referred to as single-carrier frequency division multiple access (FDMA)) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of sub carrier (SC)-FDMA symbols in the time domain as OFDM symbols in the downlink.

In the time domain, LTE downlink transmissions are organized into radio frames of 10 ms, each radio frame consisting of ten equally-sized subframes of length Tsubframe=1 ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 μs.

Furthermore, the resource allocation in LTE is typically described in terms of resource blocks (RB), where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which wireless device data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3.

From LTE Rel-11 onwards, the above described resource assignments can also be scheduled on the enhanced Physical Downlink Control Channel (EPDCCH). For Rel-8 to Rel-10 only the Physical Downlink Control Channel (PDCCH) is available.

The reference symbols shown in FIG. 3 are the cell specific reference symbols (CRS) and are used to support multiple functions including fine time and frequency synchronization and channel estimation for certain transmission modes.

In the LTE system, a wireless device, such as a user equipment (UE), is notified by the network of downlink data transmission by the physical downlink control channel (PDCCH). Upon reception of a PDCCH in a particular subframe, n, a wireless device is required to decode the corresponding physical downlink shared channel (PDSCH) and to send acknowledgement/negative acknowledgment (ACK/NAK) feedback in a subsequent subframe n+k. The ACK/NAK feedback informs the base station, such as an eNodeB, whether the corresponding PDSCH was decoded correctly. When the eNodeB detects an ACK feedback, it can proceed to send new data blocks to the wireless device. When a NAK is detected by the eNodeB, coded bits corresponding to the original data block will be retransmitted. When the retransmission is based on repetition of previously sent coded bits, it is said to be operating in a Chase combining hybrid automated repeat request (HARQ) protocol. When the retransmission contains coded bits unused in previous transmission attempts, it is said to be operating in an incremental redundancy HARQ protocol.

In LTE, the ACK/NAK feedback is sent by the wireless device using one of the two possible approaches depending on whether the wireless device is simultaneously transmitting a physical uplink shared channel (PUSCH):

If the wireless device is not transmitting a PUSCH at the same time, the ACK/NAK feedback is sent via a physical uplink control channel (PUCCH).

If the wireless device is transmitting a PUSCH simultaneously, the ACK/NAK feedback is sent via the PUSCH.

The LTE Rel-10 standard supports bandwidths larger than 20 mega-Hertz (MHz). One important requirement of LTE Rel-10 is to assure backward compatibility with LTE Rel-8. This should also include spectrum compatibility. This implies that an LTE Rel-10 carrier wider than 20 MHz should appear as a number of LTE carriers to an LTE Rel-8 terminal. Each such carrier can be referred to as a Component Carrier (CC). In particular, for early LTE Rel-10 deployments it can be expected that there will be a smaller number of LTE Rel-10-capable terminals compared to many LTE legacy terminals. One should assure an efficient use of a wide carrier also for legacy terminals, i.e., that it is possible to implement carriers where legacy terminals can be scheduled in all parts of the wideband LTE Rel-10 carrier. A straightforward way to obtain this is by means of Carrier Aggregation (CA). CA implies that an LTE Rel-10 terminal can receive multiple CC, where the CC have, or at least the possibility to have, the same structure as a Rel-8 carrier. CA is illustrated in FIG. 4. A CA-capable wireless device is assigned a primary cell (PCell) which is always activated, and one or more secondary cells (SCells) which may be activated or deactivated dynamically.

The number of aggregated CC as well as the bandwidth of the individual CC may be different for uplink and downlink. Symmetric configuration refers to the case where the number of CCs in downlink and uplink is the same whereas an asymmetric configuration refers to the case that the number of CCs is different. It is noteworthy that the number of CCs configured in a cell may be different from the number of CCs seen by a terminal: A terminal may for example, support more downlink CCs than uplink CCs, even though the cell is configured with the same number of uplink and downlink CCs. Each component carrier operates its own individual HARQ instance.

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle.

A general illustration of the listen before talk (LBT) mechanism of Wi-Fi is shown in FIG. 5. After a Wi-Fi station A transmits a data frame to a station B, station B shall transmit the ACK frame back to station A with a delay of 16 µs corresponding to a short interframe space (SIFS). Such an ACK frame is transmitted by station B without performing a LBT operation. To prevent another station interfering with such an ACK frame transmission, a station shall defer for a duration of 34 µs (referred to as a distributed coordination function interframe space (DIFS)) after the channel is observed to be occupied before assessing again whether the channel is occupied. Therefore, a station that wishes to transmit first performs a clear channel assessment (CCA) by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

In the above basic protocol, when the medium becomes available, multiple Wi-Fi stations may be ready to transmit, which can result in collision. To reduce collisions, stations intending to transmit select a random backoff counter and wait, i.e., backoff, for that number of slot channel idle times. This waiting is the backoff period. A component carrier upon which a CCA is made and for which the delay of transmission is applied is referred to herein as a backoff channel. The amount of the delay is random according to a random backoff counter. The random backoff counter is selected as a random integer drawn from a uniform distribution over the interval of [0, C] where C is a length in integers of a contention window (CW). The random backoff counter establishes the backoff period. The default size of the contention window, CWmin, is set in the IEEE specifications referred to above. Note that collisions can still happen even under this random backoff protocol when there are many stations contending for the channel access. Hence, to avoid recurring collisions, the size of the contention window is doubled whenever the station detects a collision of its transmission up to a limit, CWmax, also set in the IEEE specifications. When a station succeeds in a transmission without collision, it resets its contention window size back to the default value CWmin.

For multi-carrier operation, Wi-Fi follows a hierarchical channel bonding scheme to determine its transmission bandwidth for a frame, which could be 20 MHz, 40 MHz, 80 MHz, or 160 MHz, for example. In the 5 GHz band, wider Wi-Fi channel widths of 40 MHz, 80 MHz, 160 MHz or 80+80 MHz are formed by combining contiguous 20 MHz sub-channels in a non-overlapping manner A pre-determined primary channel performs the CW-based random access procedure after a deferral period if necessary, and then counts down the random number generated. This deferral period is therefore not the same as the backoff period. The secondary channels only perform a quick clear channel assessment (CCA) check for a point coordination function interframe space (PIFS) duration (generally 25 µs) before the potential start of transmission to determine if the additional secondary channels are available for transmission. Based on the results of the secondary CCA check, transmission is performed on the larger bandwidths; otherwise transmission falls back to smaller bandwidths. The Wi-Fi primary channel is always included in all transmissions, i.e., transmission on secondary channels alone is not allowed.

For a device not utilizing the Wi-Fi protocol, EN 301.893, v. 1.7.1 provides the following requirements and minimum behavior for the load-based clear channel assessment.

1) Before a transmission or a burst of transmissions on an Operating Channel, the equipment shall perform a Clear Channel Assessment (CCA) check using "energy detect". The equipment shall observe the Operating Channel(s) for the duration of the CCA observation time which shall be not less than 20 µs. The CCA observation time used by the equipment shall be declared by the manufacturer. The Operating Channel shall be considered occupied if the energy level in the channel exceeds the threshold corresponding to the power level given in point 5 below. If the equipment finds the channel to be clear, it may transmit immediately (see point 3 below).

2) If the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total idle period that needs to be observed before initiation of the transmission. This period is referred to as a backoff period and is typically random. Thus, the value of N shall be randomly selected in the range 1 . . . q every time an Extended CCA is required and the value stored in a random backoff counter. The value of q is selected by the manufacturer in the range 4 . . . 32.

This selected value shall be declared by the manufacturer (see clause 5.3.1 q of European Telecommunication Standards Institute (ETSI) EN 301 893V1.7.1 (2012-06)). The random backoff counter is decremented every time a CCA slot is considered to be "unoccupied". When the random backoff counter reaches zero, the equipment may transmit.
NOTE 1: The equipment is allowed to continue Short Control Signaling Transmissions on this channel providing it complies with the requirements in clause 4.9.2.3 of ETSI EN 301 893V1.7.1 (2012-06).
NOTE 2: For equipment having simultaneous transmissions on multiple (adjacent or non-adjacent) operating channels, the equipment is allowed to continue transmissions on other Operating Channels providing the CCA check did not detect any signals on those channels.
3) The total time that an equipment makes use of an Operating Channel is the Maximum Channel Occupancy Time which shall be less than (13/32)×q ms, with q as defined in point 2 above, after which the device shall perform the Extended CCA described in point 2 above.
4) The equipment, upon correct reception of a packet which was intended for this equipment, can skip CCA and immediately (see Note 3, below) proceed with the transmission of management and control frames (e.g. ACK and Block ACK frames). A consecutive sequence of transmissions by the equipment, without it performing a new CCA, shall not exceed the Maximum Channel Occupancy Time as defined in point 3 above.
NOTE 3: For the purpose of multi-cast, the ACK transmissions (associated with the same data packet) of the individual devices are allowed to take place in a sequence
5) The energy detection threshold for the CCA shall be proportional to the maximum transmit power (PH) of the transmitter: for a 23 dBm equivalent isotropically radiated power (e.i.r.p.) transmitter the CCA threshold level (TL) shall be equal or lower than −73 decibel power ratio (dBm)/MHz at the input to the receiver (assuming a 0 dB isotropic (dBi) receive antenna). For other transmit power levels, the CCA threshold level TL shall be calculated using the formula: TL=−73 dBm/MHz+23−PH (assuming a 0 dBi receive antenna and PH specified in dBm e.i.r.p.). An example to illustrate the EN 301.893 LBT is provided in FIG. 6, where X represents a failed CCA, and where, in one embodiment, each CCA of the sequence of CCA checks occupies a 9 micro-second slot.

Up to now, the spectrum used by LTE is dedicated to LTE. This has the advantage that the LTE system does not need to care about the coexistence issue and the spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE should consider coexistence with other systems such as IEEE 802.11 (Wi-Fi). Operating LTE in the same manner in the unlicensed spectrum as in the licensed spectrum can seriously degrade the performance of Wi-Fi, as Wi-Fi will not transmit once it detects the channel is occupied.

One way to utilize the unlicensed spectrum reliably is to transmit essential control signals and channels on a licensed carrier. That is, as shown in FIG. 7, a wireless device is connected to a PCell in the licensed band and one or more SCells in the unlicensed band. In this application we denote a secondary cell in unlicensed spectrum as licensed-assisted access secondary cell (LAA SCell).

The use of LTE carrier aggregation (CA), introduced since Rel-10, offers a way to increase the peak data rate, system capacity and user experience by aggregating radio resources from multiple carriers that may reside in the same band or different band.

In Rel-13, LAA (Licensed-Assisted Access) has attracted much interest in extending the LTE carrier aggregation feature towards capturing the spectrum opportunities of unlicensed spectrum in the 5 GHz band. WLAN operating in the 5 GHz band already supports 80 MHz in the field and 160 MHz is to follow in Wave 2 deployment of IEEE 802.11ac. Enabling the utilization of multi-carrier operation on unlicensed carrier using LAA is deemed necessary as further CA enhancements. The extension of the CA framework beyond 5 carriers has been started in LTE Rel-13. The objective is to support up to 32 carriers in both UL and DL.

The existing contention window adaptation protocols are based on the reception of a single automated repeat request (ARQ) feedback value (ACK/NACK) that is received after the transmission of a burst of data. In the case of LTE, first a hybrid ARQ (HARQ) protocol is followed instead of a simple ARQ protocol. Thus, multiple retransmissions based on HARQ feedback may be needed before a single ARQ feedback value at the higher layer is generated. Furthermore, in LTE the HARQ feedback is only available after a delay of 4 ms which corresponds to multiple subframes. Existing solutions assume the feedback is available after a very short time interval after the transmission ends. Thus, these solutions do not effectively deal with a system like LTE where the feedback delay is much larger. How to adapt contention window sizes in a multi-carrier setting has also not been defined yet for LAA.

On each LAA carrier, multiple wireless devices may be scheduled for reception or transmission by an eNB in a single subframe. In addition, a single LAA transmission may consist of multiple subframes. Finally, a transmission to or from a single wireless device may have multiple HARQ feedback values if the transmission is a multi-codeword transmission. Thus, there are multiple ways in which multiple feedback values may be received corresponding to a single transmission burst following a successful channel contention. A central problem is how multiple HARQ feedback values corresponding to different component carriers are used in determining the contention window size(s) for the next channel contention.

SUMMARY

Some embodiments advantageously provide a method and system for adaptation of contention windows in a multicarrier wireless communication system implementing a listen-before-talk protocol. According to one aspect, a method includes determining at least one component carrier, CC, of multiple CCs to serve as a backoff channel. The method further includes performing a listen-before-talk procedure on the at least one CC serving as a backoff channel. The listen-before-talk procedure includes sensing for each backoff channel whether a clear channel exists during a backoff period drawn from a contention window, CW. The LBT procedure also includes deferring transmitting on a CC for which the sensing does not indicate that a clear channel exists. The LBT procedure also includes transmitting on a CC for which the sensing indicates a clear channel exists. The method also includes determining a size of the CW based on at least one transmission feedback value.

According to this aspect, in some embodiments, the listen-before-talk procedure further includes performing a clear channel assessment, CCA, on CCs that do not serve as a backoff channel and transmitting on CCs for which a CCA indicates a clear channel. In some embodiments, only one CC serves as a backoff channel. In some embodiments, the transmission feedback value is a Hybrid Automatic Repeat Request, HARQ, transmission feedback value and the CW is increased only if a ratio of negative acknowledgments, NACKs, to acknowledgements, ACKs, on each component carrier, CC, exceeds a threshold. In some embodiments, the transmission feedback value is a Hybrid Automatic Repeat Request, HARQ, transmission feedback value and the CW is increased only if a ratio of negative acknowledgments, NACKs, to acknowledgements, ACKs, on all backoff channels exceeds a threshold. In some embodiments, an increase of the size of the CW is obtained by multiplication of a CW by a factor greater than one. In some embodiments, the backoff period is drawn from a joint contention window, JCW, that is determined from CWs of the multiple component carriers. In some embodiments, the JCW is a maximum of the CWs of the multiple component carriers. In some embodiments, the JCW is an average of the CWs of the multiple component carriers. In some embodiments, the CW is increased if at least one transmission on a CC results in a negative-acknowledgment, NACK, signal.

According to another aspect, a network node for adaptation of contention windows in a multicarrier wireless communication system implementing a listen-before-talk protocol is provided. The network node includes processing circuitry that includes a processor and a memory. The memory is in communication with the processor and includes executable instructions that, when executed by the processor, configure the processor to perform functions for adaptation of contention windows. The processor is further configured to determine at least one component carrier, CC, of multiple CCs to serve as a backoff channel and to perform a listen-before-talk procedure on the at least one CC serving as a backoff channel. The listen-before-talk procedure includes sensing for each backoff channel whether a clear channel exists during a backoff period drawn from a contention window, CW, deferring transmitting on a CC for which the sensing does not indicate that a clear channel exists, and determining a size of CW based on at least one transmission feedback value. The network node further includes a transmitter configured to transmit on CCs for which the sensing indicates a clear channel exists.

According to this aspect, in some embodiments, the listen-before-talk procedure further includes performing a clear channel assessment, CCA, on CCs that do not serve as a backoff channel, and transmitting on CCs for which a CCA indicates a clear channel. In some embodiments, only one CC serves as a backoff channel. In some embodiments, the transmission feedback value is a Hybrid Automatic Repeat Request, HARQ, transmission feedback value and CW is increased only if a ratio of negative acknowledgments, NACKs, to acknowledgements, ACKs, on each backoff channel exceeds a threshold. In some embodiments, the transmission feedback value is a Hybrid Automatic Repeat Request, HARQ, transmission feedback value and the CW is increased only if a ratio of negative acknowledgments, NACKs, to acknowledgements, ACKs, on all backoff channel exceeds a threshold. In some embodiments, an increase of the size of the CW is obtained by multiplication of a CW by a factor greater than one. In some embodiments, the backoff period is drawn from a joint contention window, JCW, that is determined from CWs of the multiple component carriers. In some embodiments, the JCW is a maximum of the CWs of the multiple component carriers. In some embodiments, the JCW is an average of the CWs of the multiple component carriers. In some embodiments, the CW is increased if at least one transmission on a CC results in a negative-acknowledgment, NACK, signal.

According to yet another aspect, a network node for adaptation of contention windows in a multicarrier wireless communication system implementing a listen-before-talk protocol is provided. The network node includes a listen-before-talk module, configured to perform a listen-before-talk, LBT, procedure for each of at least one component carrier, CC, serving as a backoff channel, to determine whether a clear channel exists on the backoff channel during a backoff period drawn from a contention window, CW. The network node also includes a contention window size determination module configured to determine a size of the CW based on at least one transmission feedback value. The network also includes a transmitter module configured to transmit on CCs for which the sensing indicates a clear channel exists, and defer transmitting on CCs for which the sensing does not indicate that a clear channel exists.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
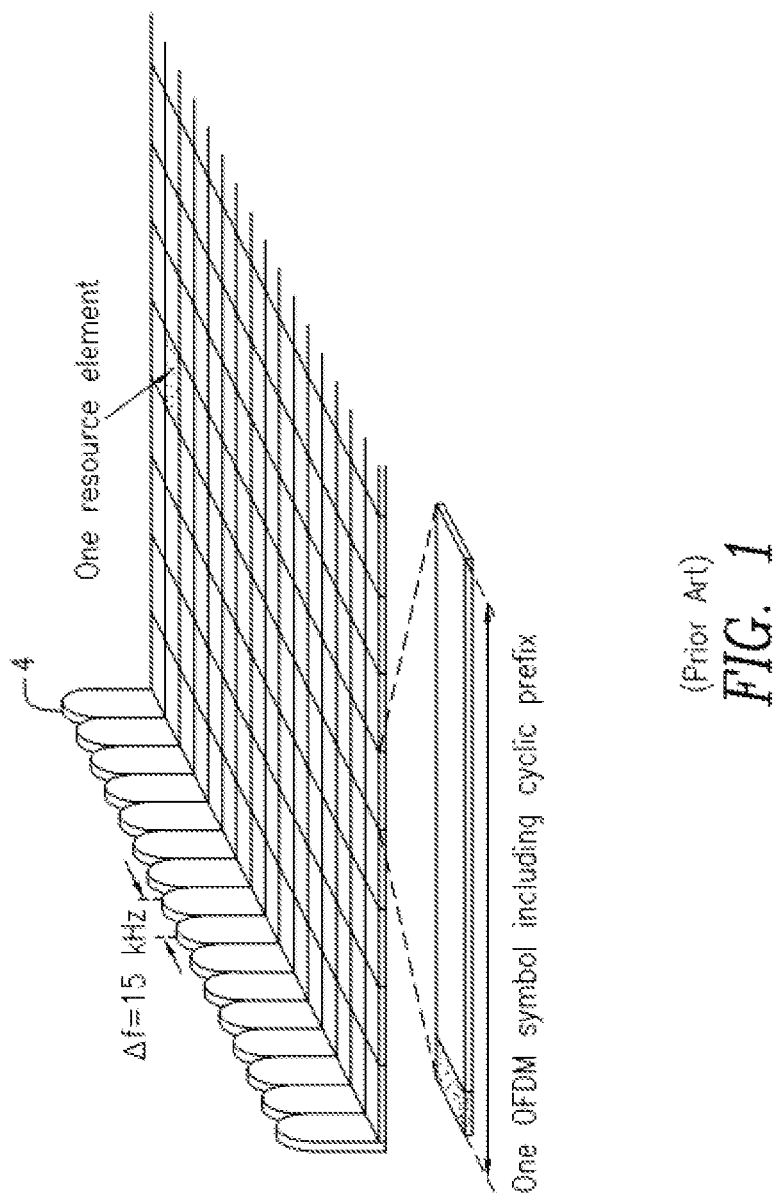
FIG. 1 is a time frequency grid.
Figure 2:
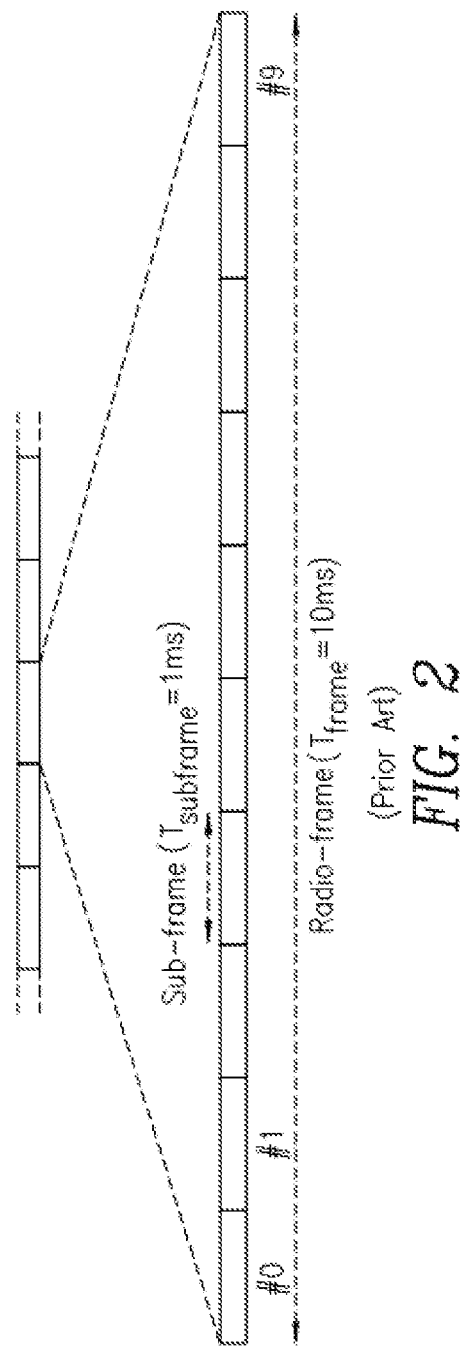
FIG. 2 is a time domain representation of frames and subframes.
Figure 3:
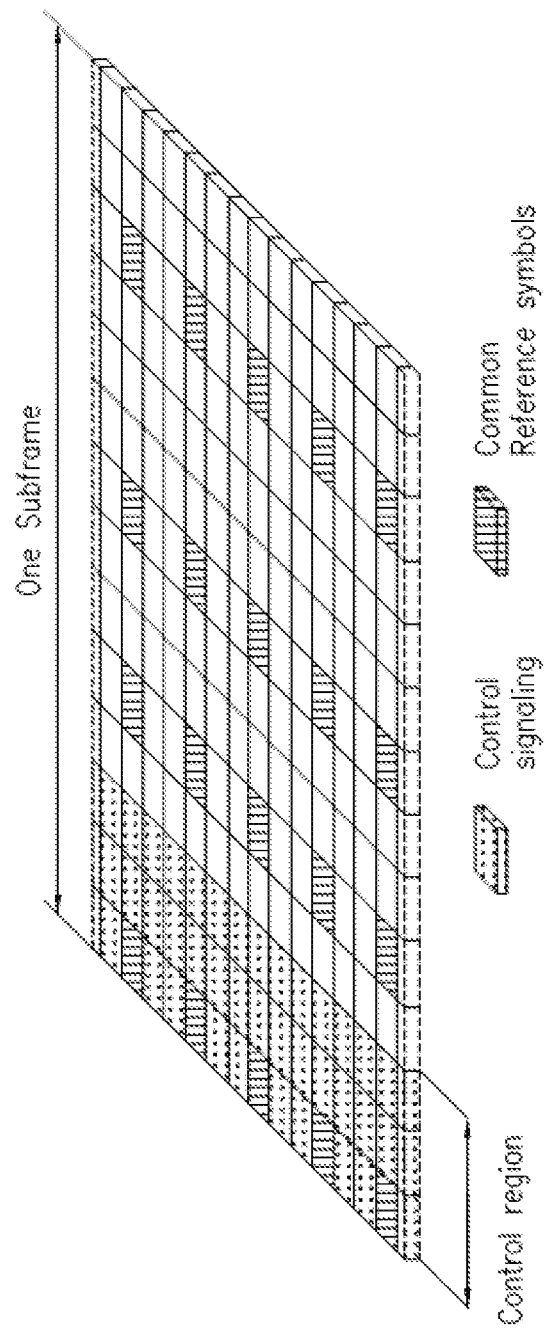
FIG. 3 is a time frequency grid showing control signaling and reference symbols.
Figure 4:
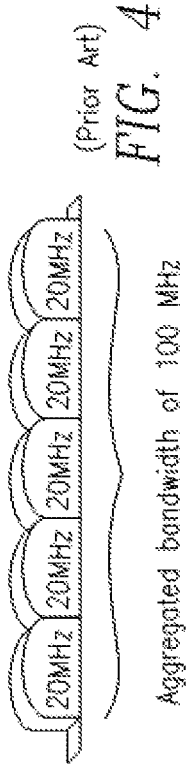
FIG. 4 illustrates aggregated carriers.
Figure 5:
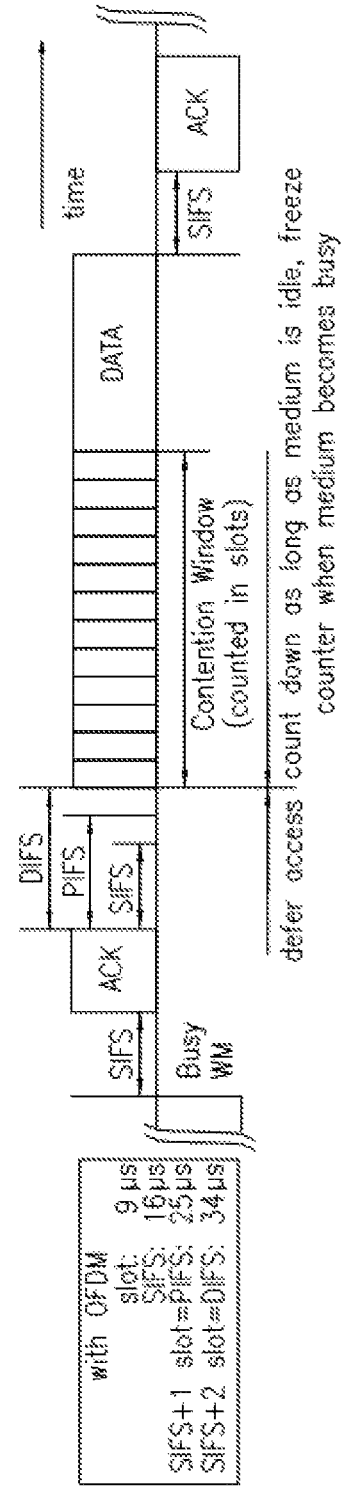
FIG. 5 illustrates an LBT process.
Figure 6:
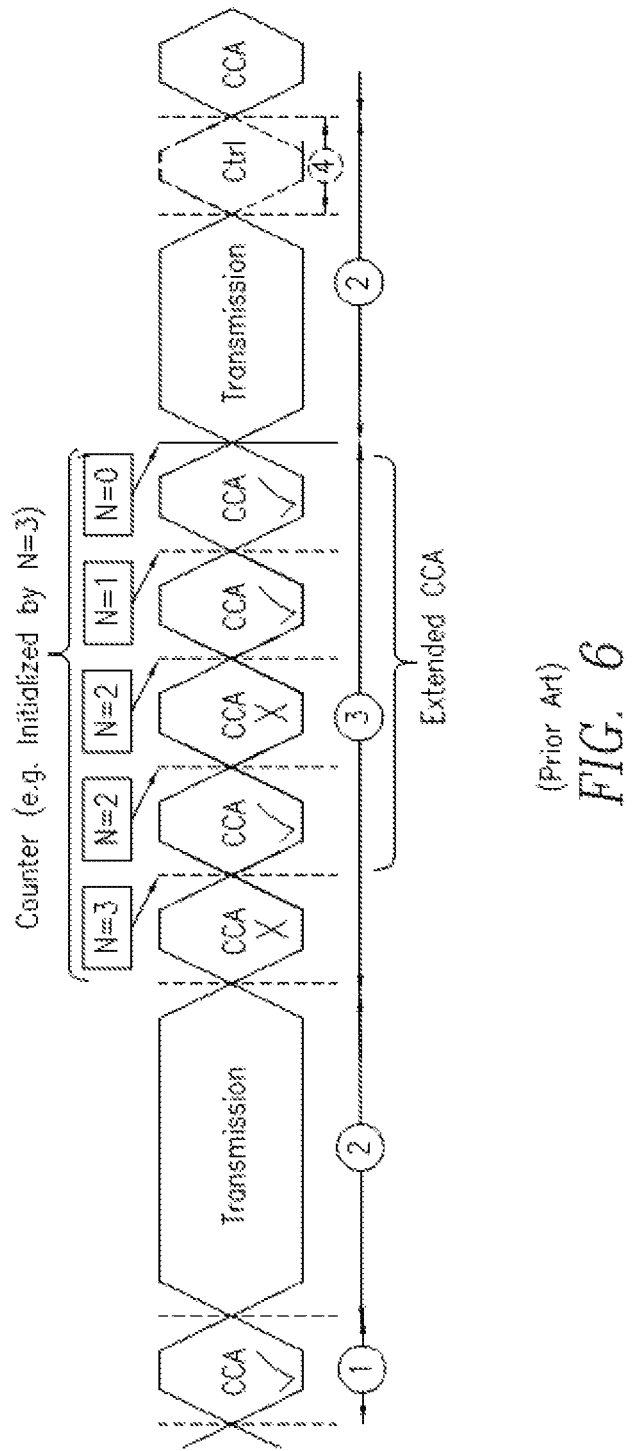
FIG. 6 illustrates a process for load based clear channel assessment.
Figure 7:
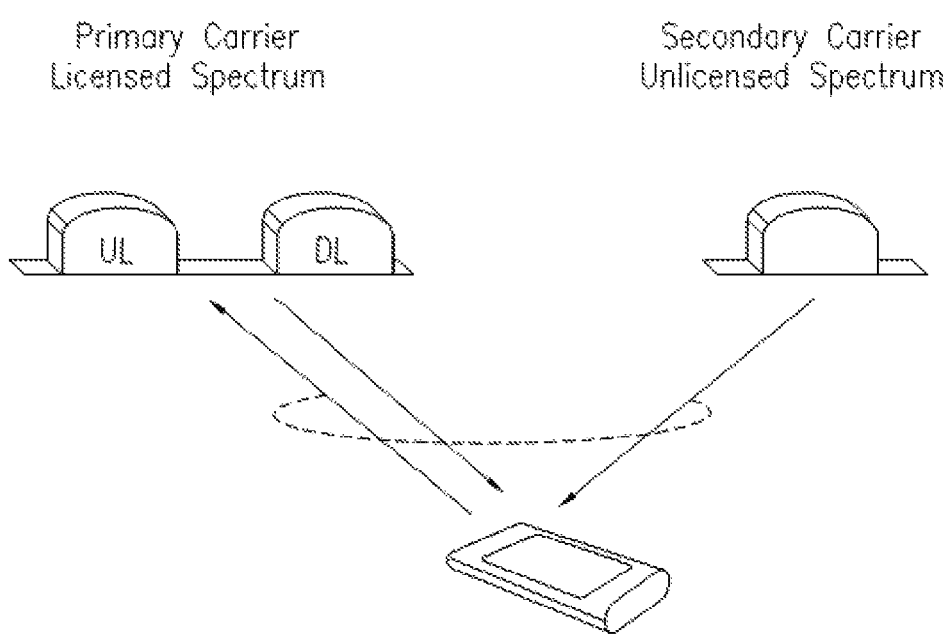
FIG. 7 illustrates transmission on a licensed carrier and an unlicensed carrier for a wireless device.

Before describing in detail exemplary embodiments, it is noted that the embodiments reside primarily in combinations of apparatus components and processing steps related to adaptation of contention windows in multi-carrier listen-before-talk (LBT) protocols. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The term "network node" used herein may refer to a radio network node, e.g., a core network node, mobile switching center (MSC), mobile management entity (MME), operation and maintenance (O&M), operation support system (OSS), self-organizing network (SON), positioning node (e.g., enhanced serving mobile location center (E-SMLC)), mobile data terminal (MDT) node, etc. The term network node, as used herein, may also include a wireless device, such as a user equipment (UE), in a cellular or mobile communication system. Examples of a wireless device are target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles etc.

The term "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Various embodiments address ways to adapt contention windows used in LBT for channel access during multi-carrier operation. The embodiments describe various methods by which contention window sizes can be varied based on one or more HARQ feedback values from one or more component carriers. Separate embodiments address the cases where there are individual random backoff processes on each carrier, and when there is a single random backoff process located on one of the available carriers.

A description of the proposed contention window variation techniques for LBT protocols follows. This is generally applicable for both downlink (DL) and uplink (UL) transmissions, for both frequency division duplex (FDD) and time division duplex (TDD) systems. Thus, embodiments described herein may be implemented in a wireless device or base station or other network node. These are referred to generally as network nodes. In the following, the contention window from which a random backoff counter can be drawn for a new LBT attempt is represented by CW so that the random backoff counter drawn falls within [0, C]. The default contention window size is denoted by CWmin. In the event that the CW is increased, in one example the current CW is doubled to obtain the new upper limit on the CW. A maximum value of CWmax may be imposed on the CW, such that the size of CW≤CWmax always.

Some embodiments address LBT for data transmissions that are carried for example on the PDSCH or PUSCH of a particular CC, and in general can be per beam of a particular CC. The receiver of a data transmission may provide HARQ feedback to the transmitter to indicate whether the data has been received successfully (ACK) or not (NACK) according to LTE specifications. The NACK here corresponds to the scheduled data. The contention window size is modified by the transmitter based on the HARQ feedback. In some embodiments, the modifications are based on all the previously unused HARQ feedback received that are available at the time the LBT operation is performed to access the channel As a non-limiting example, a HARQ feedback value for a transmission in subframe n is assumed to be available for use in adjusting a LBT procedure that occurs at a time no earlier than n+5, i.e., at least five subframes later. This is because of the 4 ms HARQ feedback delay currently used in LTE, as well as any additional processing delay. The HARQ feedback delay may be reduced in future releases of LTE and embodiments described herein may be adapted accordingly. A transmission burst refers to a transmission by a network node performed after a successful channel contention. The transmission burst may have one or more subframes with each subframe having transmissions to one or more users and the transmissions to one or more users containing one or more codewords that can each receive individual HARQ feedback. Each transmission burst must be preceded by a successful LBT procedure where the network node determines the channel to be free to transmit.

The following embodiments can be easily extended for the multi-beam transmission per CC. Also, in the multicarrier transmissions, the following embodiments can be considered for a group or set of the carriers where the number of groups or sets of carriers and their corresponding members can be changed or be reconfigurable. A set or a group can have one or more component carriers or one or more beams. Different groups can apply one method or combination of methods described in the following embodiments. The methods can be the same or different for different groups and can be changed by time.

A first embodiment considers the multi-carrier scenario with multiple backoff channels at a network node. In the case of multiple backoff channels, the network node that wants to access the channel performs LBT on each carrier with either the same random backoff counter, or different random backoff counters drawn from within the same CW. A random backoff counter determines the backoff period during which the network node does not transmit. The network node then transmits on the corresponding carriers where LBT succeeds and defers transmission on carriers which did not finish the backoff procedure. CCs that have completed their backoff may defer their transmission until other, additional CCs also complete their backoff.

Figure 8:
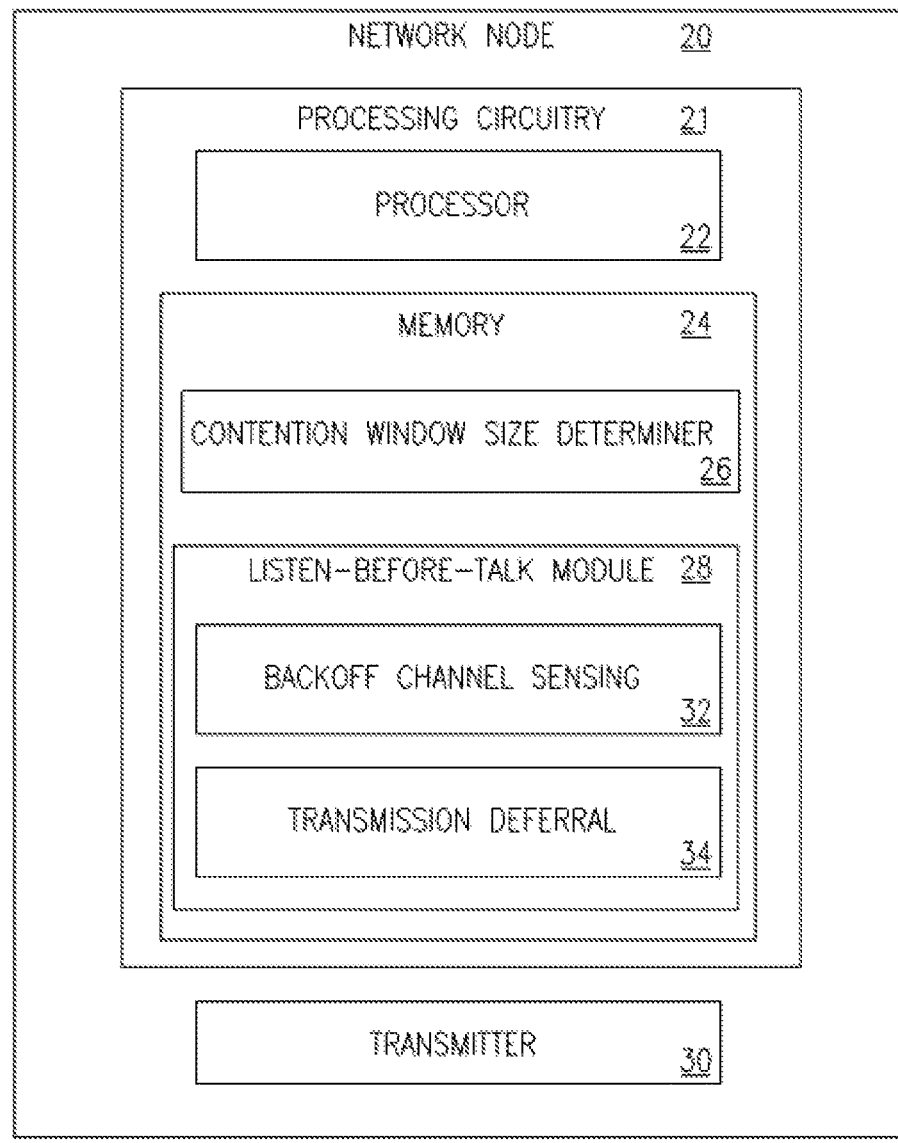
FIG. 8 is a block diagram of an embodiment of a network node constructed in accordance with principles set forth herein.

FIG. 8 is a block diagram of a network node 20 configured to perform adaptation of contention window size in a multicarrier wireless communication system implementing a listen-before-talk protocol. The network node 20 has processing circuitry 21. In some embodiments, the processing circuitry may include a memory 24 and processor 22, the memory 24 containing instructions which, when executed by the processor 22, configure processor 22 to perform the one or more functions described herein. In addition to a traditional processor and memory, processing circuitry 21 may comprise integrated circuitry for processing and/or control, e.g., one or more processors and/or processor cores and/or FPGAs (Field Programmable Gate Array) and/or ASICs (Application Specific Integrated Circuitry).

Processing circuitry 21 may comprise and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 21 may be configured to control any of the methods described herein and/or to cause such methods to be performed, e.g., by processor 22. Corresponding instructions may be stored in the memory 24, which may be readable and/or readably connected to the processing circuitry 21. In other words, processing circuitry 21 may include a controller, which may comprise a microprocessor and/or microcontroller and/or FPGA (Field-Programmable Gate Array) device and/or ASIC (Application Specific Integrated Circuit) device. It may be considered that processing circuitry 12 includes or may be connected or connectable to memory, which may be configured to be accessible for reading and/or writing by the controller and/or processing circuitry 21.

The network node 20 may be a wireless device such as a mobile phone, or may be a base station, e.g., eNodeB. In some embodiments, the processing circuitry 21 may be implemented by application specific integrated circuitry or a programmable gate array. In some embodiments, the memory may include a contention window size determiner 26 and a listen-before-talk unit 28. The network node 20 may also include a transmitter 30. The contention window size determiner 26 is configured to determine a size of a contention window (CW) based on at least one Hybrid Automatic Repeat (HARQ) feedback value. The LBT unit 28 is configured to perform sensing via backoff channel sensing unit 32 for each of multiple component carriers (CCs) to determine whether a clear channel exists on a carrier during the CW. The sensing may be a LBT procedure. The transmitter 30 is configured to transmit on CCs for which the LBT procedure indicates a clear channel exists; and defer transmitting via transmission deferral unit 34 on CCs for which the LBT procedure does not indicate that a clear channel exists.

Figure 9:
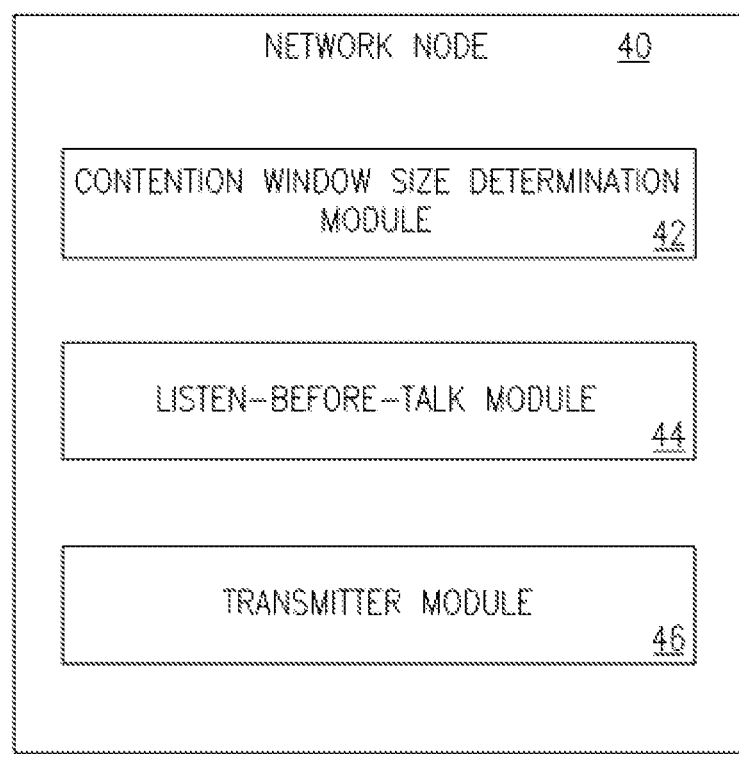
FIG. 9 is a block diagram of an alternative embodiment of a network node constructed in accordance with principles set forth herein.

FIG. 9 is a block diagram of an alternative embodiment of a network node 40 configured to perform adaptation of contention window size in a multicarrier wireless communication system implementing a listen-before-talk protocol. The network node 40 includes a contention window size determination module 42 and a LBT module 44. These modules may be implemented as software modules containing instructions that, when executed by a processor, configure the processor to perform functions describe herein. The network node 40 may also include a transmitter module 46 configured to transmit on CCs for which the LBT procedure indicates that a clear channel exists.

Figure 10:
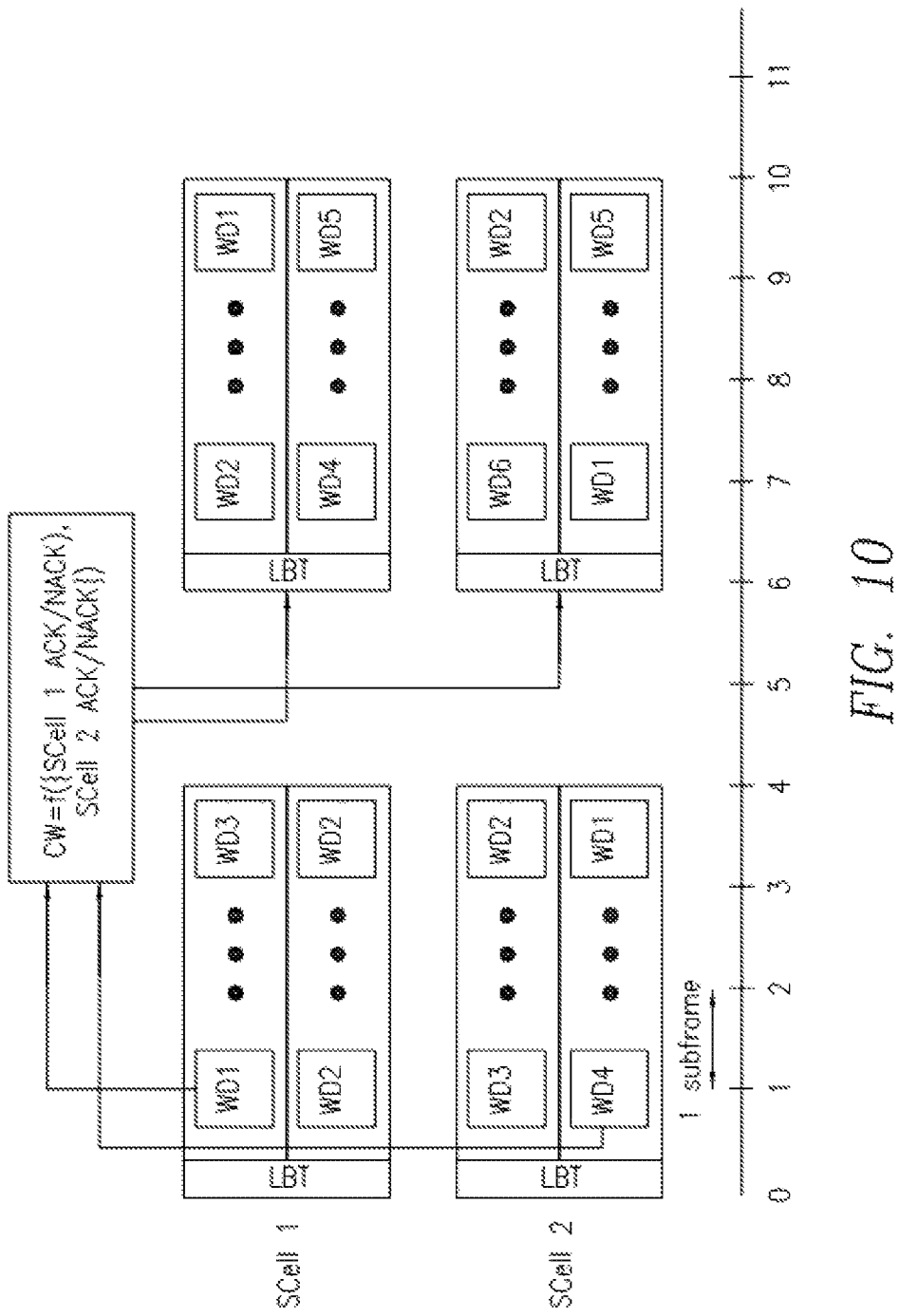
FIG. 10 illustrates a first embodiment of a random back off procedure.

Operation of the network node 20, 40 is discussed below by way of examples. Of note, although embodiments are discussed with respect to network node 20, it is understood that the embodiments are equally implementable using network node 40. An illustrative example of DL multi-carrier LBT with two CCs on the unlicensed band and each CC performing its own random backoff procedure is shown in FIG. 10. All CCs share a common CW. In the figure, each CC performs a successful LBT procedure via the listen before talk unit 28 with the same random backoff counter at subframe 0, followed by a transmission burst of four subframes via of transmitter 30. The listen before talk procedure implemented by the LBT unit 28 includes backoff channel sensing via backoff channel sensing unit 32 and transmission deferral via transmission deferral unit 34. On the first transmission time interval (TTI) of the burst, wireless device (WD) WD 1 and WD 2 are scheduled by SCell 1, while on SCell 2, WD 3 and WD 4 are scheduled for single codeword and multiple-codeword reception, respectively. The HARQ feedback values corresponding to these transmissions are available to the transmitting eNB by the start of the LBT procedure prior to the next intended transmission burst at subframe 6. HARQ feedback values for subframe 1 of the same transmission burst are not available, and therefore are not used to determine the CW for the next LBT phase at subframe 6. The LBT procedure for the next transmission burst therefore uses all the previously unused HARQ feedback values that are available at that point.

Note that HARQ feedback values for different codewords transmitted to a single user in a subframe may be combined to form a single effective HARQ feedback value, for example using a logical AND or a logical OR operation. In addition, in some embodiments, one may use only the HARQ feedbacks corresponding to the scheduled users for the intended LBT. HARQ feedback values may be combined in additional ways across users and subframes.

In the following list of exemplary implementations of this embodiment, a binary exponential backoff scheme is assumed where the CW for the next LBT procedure is doubled when it is determined that it should be increased. In some embodiments, the rate of CW increase may not be binary exponential, i.e., instead of being doubled it may be scaled by some factor greater than 1. The CW size is determined by the contention window size determiner 26.

In a first example, the size of the CW is doubled if any wireless device on any CC has a NACK.

In a second example, the size of the CW is doubled only if all CCs have at least one wireless device with a NACK.

In a third example, the size of the CW is doubled only if the ratio of NACKs to ACKS on each CC exceeds a threshold.

In a fourth example, the size of the CW is doubled only if the ratio of NACKs to ACKS on any CC exceeds a threshold.

In a fifth example, the size of the CW is doubled only if the ratio of NACKs to ACKs across all CCs combined exceeds a threshold.

In a sixth example, the size of the CW is doubled only if the ratio of CCs that have one or more NACK exceeds a threshold.

In a seventh example, the size of the CW is doubled only if the ratio of NACKED CCs exceeds a threshold. A NACKED CC is a CC that has a ratio of NACKS to ACKS that is higher than a threshold In an eighth example, the size of the CW is doubled only if a certain number 'K' of CCs has a ratio of NACKs to ACKS that exceeds threshold. The number of CC can be parameterized and adaptive depending on the number of carriers in congestions. For instance, if there are many carriers in congestion, K can be reduced. In the opposite case, it can be increased to have more conservative CW doubling.

In a ninth example, the size of the CW is doubled only if a certain number 'K' of CCs has one or more NACKs. The number of CC can be parameterized and adaptive depending on the number of carriers in congestions. For instance, if there are many carriers in congestion, K can be reduced. In the opposite case, it can be increased to have more conservative CW doubling.

The next set of exemplary implementations describes how to decrease the CW based on HARQ feedback values.

In a first example, the size of the CW is reset to CWmin if all HARQ feedback values across all CCs are ACKs.

In a second example, the size of the CW is reset to CWmin if each backoff channel has a number of ACKs greater than some threshold.

In a third example, the size of the CW is reset to CWmin if the number of ACKs across all CCs combined exceeds a threshold.

In a fourth example, the size of the CW is reset to CWmin only if a certain number 'K' of CCs have a number of ACKs greater than some threshold. The number of CC can be parameterized and adaptive depending on the number of carriers in congestions. For instance, if there are many carriers in congestions, K can be increased. In the opposite case, it can be decreased to be more aggressive in resetting CW.

In a fifth example, the size of the CW is reset to CWmin after the CWmax is used for a certain number of time intervals, consecutively.

A second embodiment addresses a multi-carrier scenario with multiple backoff channels at a network node 20. In the case of multiple backoff channels, the network node 20 that wants to access the channel performs LBT on each carrier with either the same random backoff counter, or different random backoff counters drawn from within the same CW. The network node 20 then transmits on the corresponding carriers where LBT succeeds and defers transmission, via transmission deferral unit 34, on carriers which did not finish the random backoff procedure. CCs that have completed their backoff may defer their transmission until other, additional CCs also complete their backoff.

In this embodiment, a contention window, CWi, is maintained for a channel i, separately from other channels, based on the CW tracking protocol for a single channel as is known in the art. The said same or different random backoff counters to be used in the LBT for the carriers is or are drawn from a joint contention window (JCW) that is determined by the CWs of these carriers.

In one exemplary implementation, the JCW is the max of the CWi. For instance, $$JCW = \max(CW1, CW2, \ldots, CW5)$$

in the case of five LBT channels.

In another exemplary implementation, the JCW is the linear average of the CWi. For instance, $$JCW = \frac{CW1 + CW2 + \ldots + CW5}{5}$$

in the case of five LBT channels.

In yet another exemplary implementation, the JCW is the harmonic average of the CWi. For instance, $$JCW = \left(\frac{1}{CW1} + \frac{1}{CW2} + \ldots + \frac{1}{CW5}\right)^{-1}$$

in the case of five LBT channels.

In a further exemplary implementation, the JCW is the max of the CWi. For instance, $$JCW = \sqrt[5]{CW1 \times CW2 \times \ldots \times CW5}$$

in the case of five LBT channels.

In another exemplary implementation, the JCW is a weighted average of the CWi. For instance, $$JCW = \frac{w_1 \times CW1 + w_2 \times CW2 + \ldots + w_5 \times CW5}{w_1 + w_2 + \ldots + w_5}$$

in the case of five LBT channels. The weight $w_i$ for a channel i reflects the aspects of the operation conditions of the channel i.

In one embodiment, the weight $w_i$ for a channel i reflects the bandwidth of the channel.

In another embodiment, the weight $w_i$ for a channel i reflects the average noise and interference level of the channel.

In yet another embodiment, the weight $w_i$ for a channel i reflects the transmission power of the channel.

Figure 11:
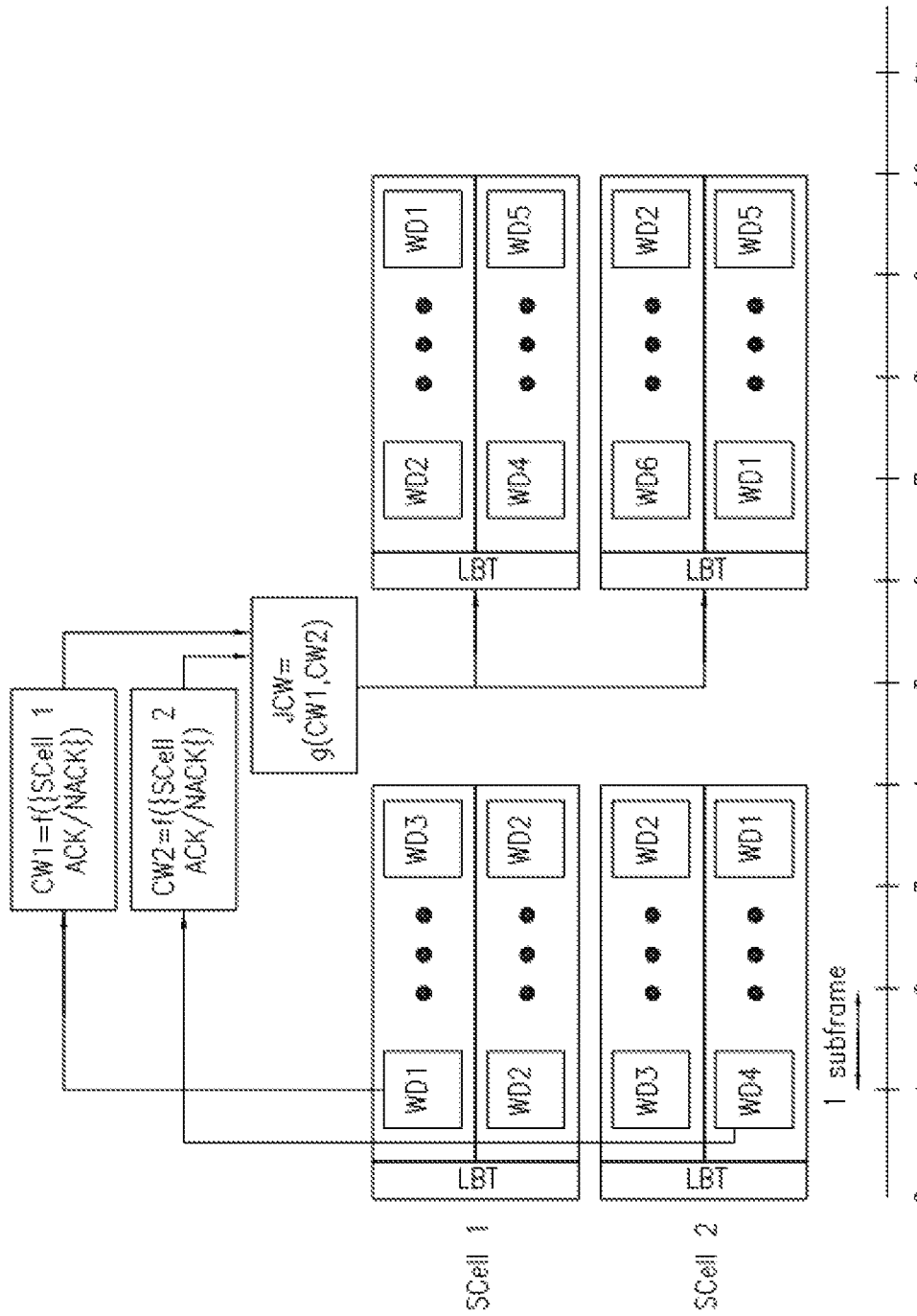
FIG. 11 illustrates a second embodiment of a random back off procedure.

An illustrative example of DL multi-carrier LBT with two CCs on the unlicensed band and each CC performing its own random backoff procedure is shown in the embodiment of FIG. 11. In the embodiment of FIG. 11, each CC maintains a separate CW, CW1 and CW2. In contrast, in the embodiment of FIG. 10, each CC performs a successful LBT procedure with the same random backoff counter at subframe 0, followed by a transmission burst of four subframes. In FIG. 11, on the first TTI of the burst, WD 1 and WD 2 are scheduled by SCell 1, while on SCell 2, WD 3 and WD 4 are scheduled for single codeword and multiple-codeword reception, respectively. The HARQ feedback values corresponding to these transmissions are available to the transmitting eNB by the start of the LBT procedure prior to the next intended transmission burst at subframe 6. In addition, in some embodiments, one may use only the HARQ feedbacks corresponding to the scheduled users for the intended LBT. New CW1 and CW2 are computed based on the HARQ feedbacks for the two channels. The JCW is determined based on CW1 and CW2. A random backoff counter may be drawn based on JCW and supplied to both channels for LBT operations.

A third embodiment addresses the multi-carrier scenario with a single backoff channel. In a first method of this third embodiment, the network node 20 performs LBT with full-fledged random backoff on only one of the multiple carriers. A short time before the expected completion of the random backoff process, the network node 20 does a quick CCA check on the other carriers, and transmits on the backoff channel plus a subset of the other carriers that are determined to be free based on the quick CCA check. The carriers on which the quick CCA check is performed are denoted as ancillary carriers. As a non-limiting example, the duration of the quick CCA check on the ancillary carriers may be equal to or larger than the PIFS duration of Wi-Fi (generally 25 µs).

Figure 12:
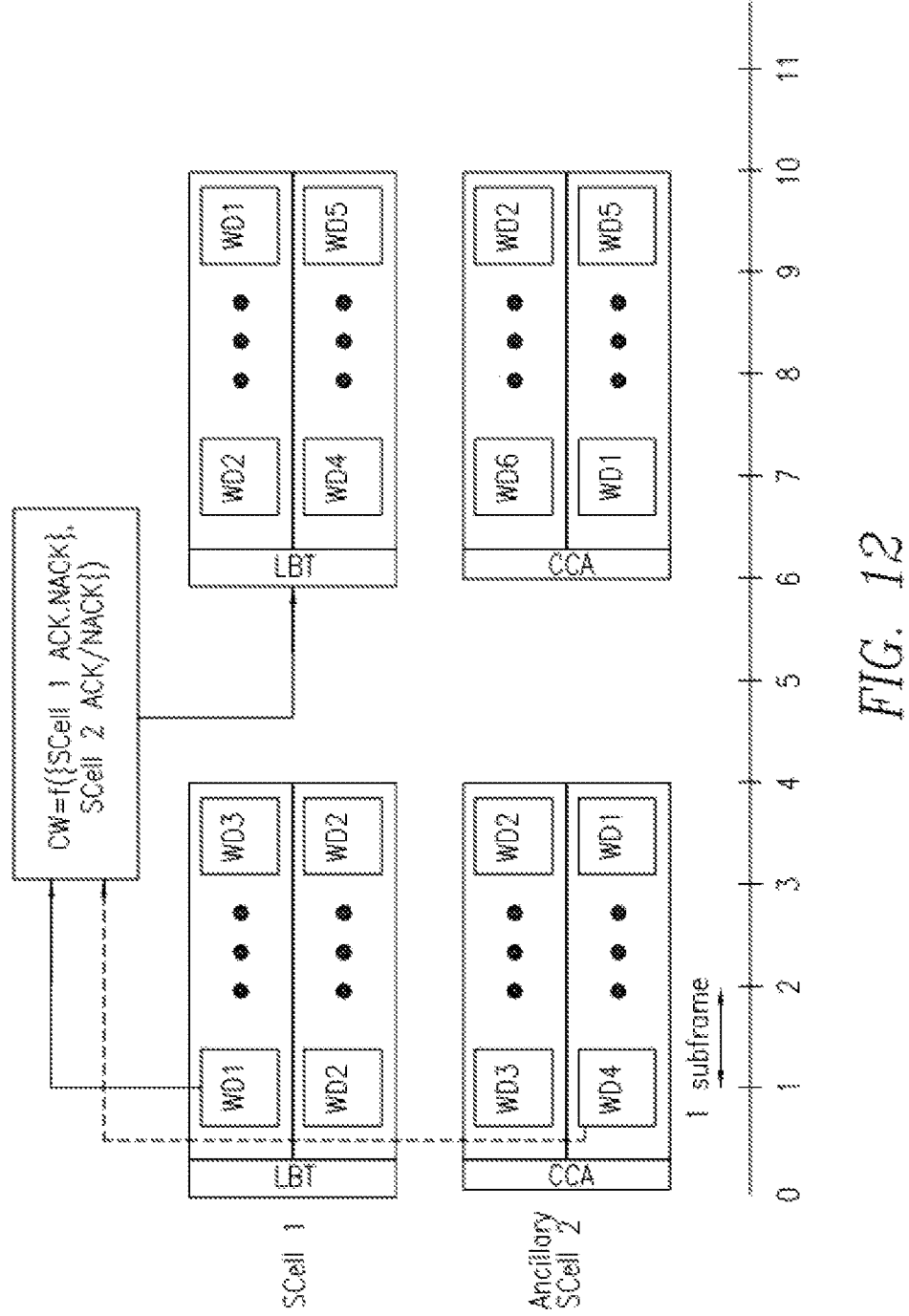
FIG. 12 illustrates a third embodiment of a random backoff procedure.

An illustrative example of a single backoff channel and one ancillary CC is shown in the embodiment of FIG. 12, where the sole backoff channel is placed on SCell 1, and SCell 2 is operated as an ancillary carrier. SCell 1 conducts LBT tests with full random backoff at subframes 0 and 6 in this example, while the ancillary CC conducts a quick CCA check that is initiated by the backoff channel. The CW used in the LBT process prior to the transmission burst from subframe 6 takes into account the HARQ feedback values from subframe 0 of both CCs in the previous transmission burst. The scheme described above can be applied to an arbitrary number of ancillary CCs that need not be contiguous in frequency. Note that HARQ feedback values may be combined to obtain an effective feedback value as described above with respect to the first embodiment.

Figure 13:
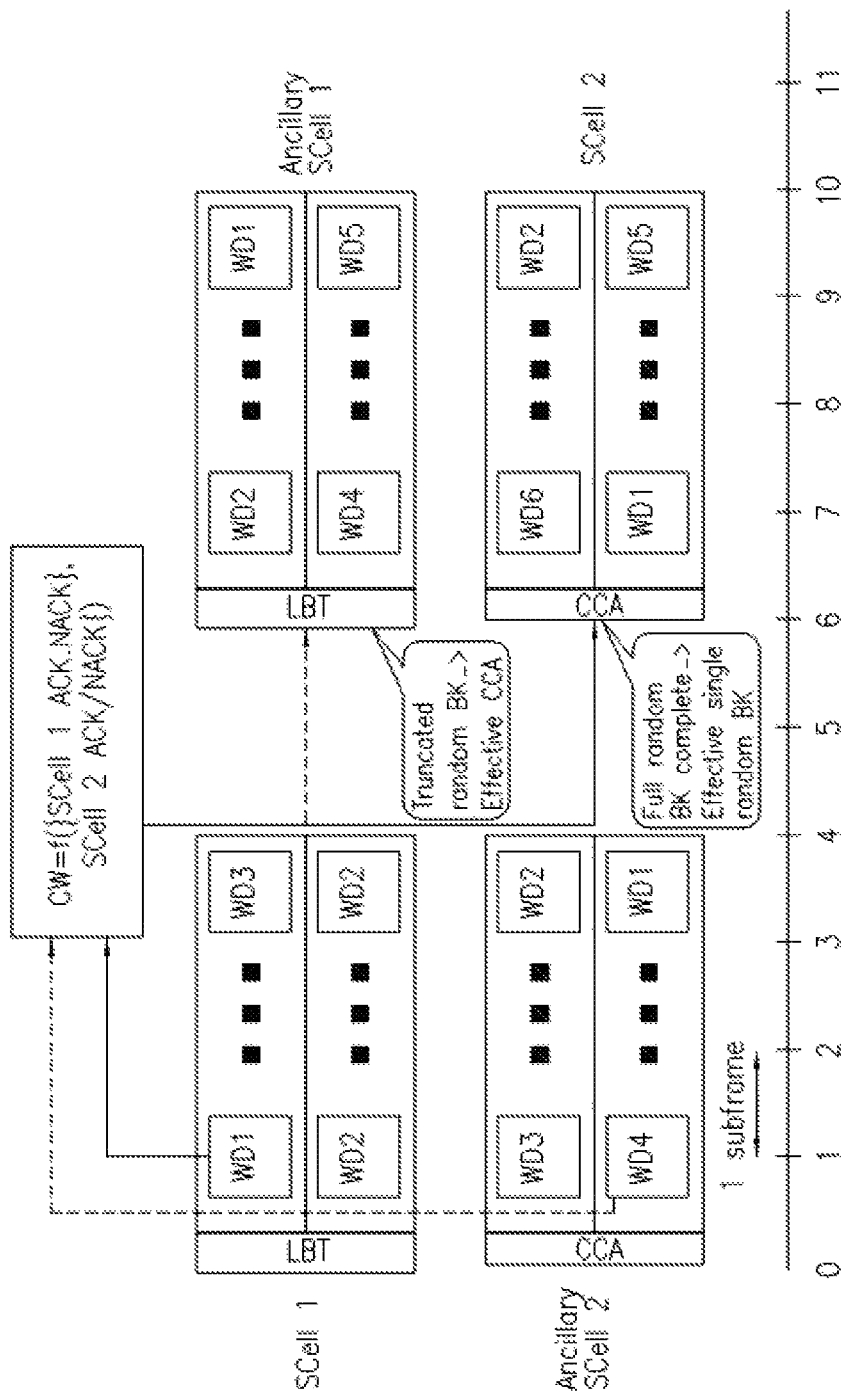
FIG. 13 illustrates a fourth embodiment of a random backoff procedure.

In a second method of the third embodiment the network node runs parallel full random backoff on multiple carriers with a common CW and when one is completed first, the channel is monitored for a short time before completion of that carrier. If the channel is found to be idle, a corresponding random backoff is truncated. Otherwise, the random backoff is continued. The network node 20 in fact performs LBT with full-fledged random backoff on some of the carriers where those carriers are all the carriers or a subset of them. During the random backoff procedures on those carriers, the carrier which completes the random backoff first, is considered effectively as the carrier with full-fledge random backoff. As in the first method, the outcome of a quick CCA check on all other carriers may be utilized. For this purpose, the network node 20 evaluates whether the channel is idle on all other carriers that are doing full random backoff or does a quick CCA check on the other carriers without full random backoff. If the network node 20 finds that the other carriers are idle, it truncates their corresponding random backoff and uses the last CCA(s) as effective CCA. The network node 20 transmits on the effective backoff channel plus the other carriers that are found to be free for a short period of time. Those carriers except the effective random backoff carrier are denoted as ancillary carriers. As a non-limiting example, the duration of the short time during which the channel is idle, and/or quick CCA check on the ancillary carriers is performed, may be equal to or larger than the PIFS duration of Wi-Fi (generally 25 μs). Thus, in some embodiments, for each channel that is not a backoff channel, the eNB senses the channel for at least a sensing interval T=25 μs immediately before transmitting on the backoff channel. Therefore, CCA on CCs that do not serve as a backoff channel should be performed immediately before transmitting on the backoff channel An illustrative example of an effective single backoff channel and one ancillary CC is shown in FIG. 13, where both SCell 1 and sCell 2 start with random backoff, where, however, the random backoff of the SCell 1 completes first. The SCell 2 finds the channel is idle for a short backoff period of time as part of its random backoff and truncate its random back off and can be considered as an effective CCA. Hence, the sole effective backoff channel is placed on SCell 1, and SCell 2 is operated as an effective ancillary carrier. LBT tests are performed for transmissions at subframes 0 and 6. The CW used in the LBT process prior to the transmission burst from subframe 6 takes into account the HARQ feedback values from subframe 0 of both CCs in the previous transmission burst. The scheme described above can be applied to an arbitrary number of ancillary CCs that need not be contiguous in frequency. Note that HARQ feedback values may be combined to obtain an effective feedback value as described above with respect to the first embodiment.

Figure 14:
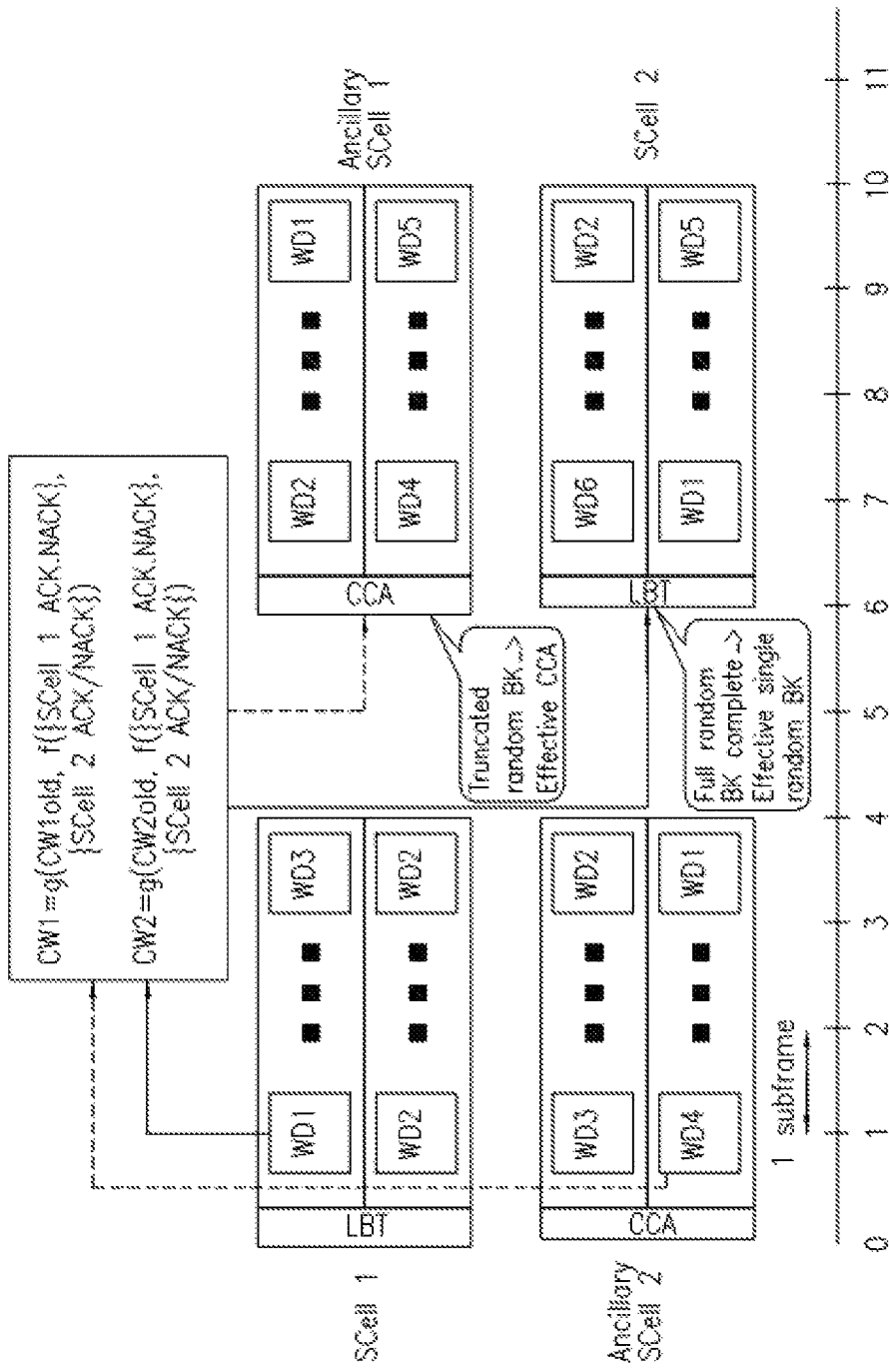
FIG. 14 illustrates a fifth embodiment of a random backoff procedure.
Figure 15:
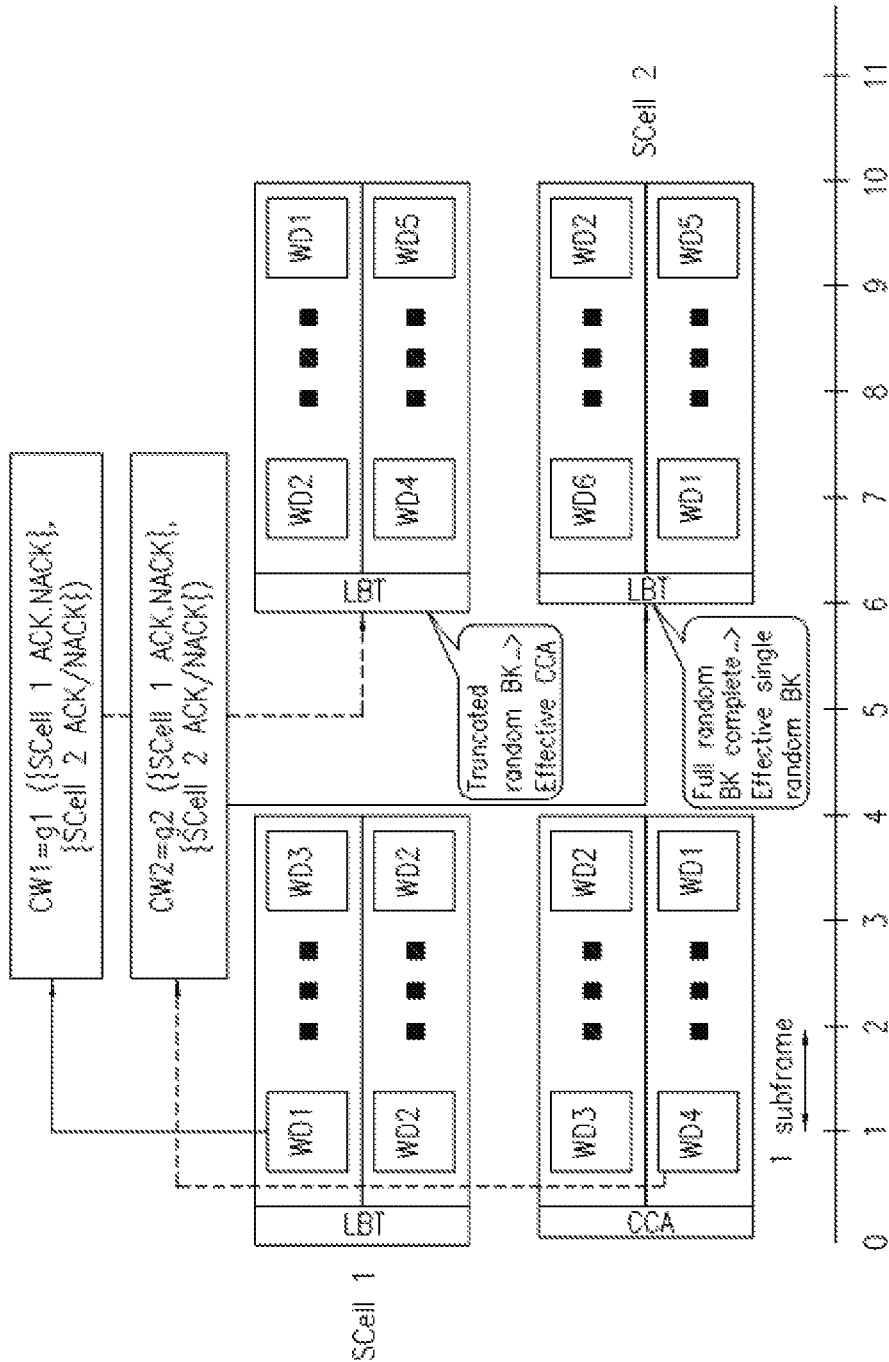
FIG. 15 illustrates a sixth embodiment of a random backoff procedure.

A third method is similar to the second embodiment described above with the difference that every SCell tracks its own CW but either follows a common rule to adapt the contention window or its own rule to adapt the contention window. FIGS. 12 and 13 illustrate these two variants of the third method, respectively. In the embodiment of FIG. 12, only one backoff channel is present (Scell 1), and a quick CCA is performed on SCell 2. The CW adaptation is performed for Scell 1 in FIG. 12. In the embodiment of FIG. 13, there are two backoff channels, on Scells 1 and 2. A common CW is applied to both these cells. FIG. 14 shows adaptation of the contention window following a common rule, and FIG. 15 shows adaptation of the contention window using a rule for each cell.

In the following list of exemplary implementations of this embodiment, a binary exponential backoff scheme is assumed where the size of the CW for the next LBT procedure is doubled when it is determined that it should be increased. It is to be understood that the rate of CW increase may not be binary exponential, i.e., instead of being doubled it may be scaled by some factor greater than 1.

In the first example implementation, the size of the CW is doubled only if one or more wireless devices report a NACK on the single backoff channel In the second example, the size of the CW is doubled only if the ratio of NACKs to ACKS on the single backoff channel exceeds a threshold.

In the third example implementation, the size of the CW is doubled if any CC (backoff channel or ancillary channel) has one or more NACKs.

In the fourth example implementation, the size of the CW is doubled if any CC (backoff channel or ancillary channel) has a ratio of NACKs to ACKS that exceeds threshold. The threshold may be different for ancillary carriers compared to the single backoff channel In the fifth example implementation, the size of the CW is doubled only if all CCs (backoff channel and ancillary channels) have one or more NACKs.

In the sixth example, the size of the CW is doubled only if a certain number 'K' of CCs (backoff channel and ancillary channels) has one or more NACKs. The number of CC can be parameterized and adaptive depending on the number of carriers in congestions. For instance, if there are many carriers in congestions, K can be reduced. In the other opposite case, it can be increased to have more conservative CW doubling.

In the seventh example, the size of the CW is doubled only if a certain number 'K' of CCs (backoff channel and ancillary channels) has a ratio of NACKs to ACKS that exceeds threshold. The number of CC can be parameterized and adaptive depending on the number of carriers in congestions. For instance, if there are many carriers in congestions, K can be reduced. In the other In the opposite case, it can be increased to have more conservative CW doubling.

The next set of exemplary implementations describes how to decrease the CW based on HARQ feedback values when a single backoff channel is in use. It is to be understood that the rate of CW decrease may not be being reset to CWmin. Instead, it may be decrease by some factor greater or less than 1.

In the first example, the size of the CW is reset to CWmin if the single backoff channel receives one or more ACKs.

In the second example, the size of the CW is reset to CWmin if the backoff channel and all ancillary carriers have a number of ACKs greater than some threshold. The threshold may be different for ancillary carriers compared to the single backoff channel.

In the third example, the size of the CW is reset to CWmin only if a certain number 'K' of CCs (backoff channel and ancillary channels) have a number of ACKs greater than some threshold. The number of CC can be parameterized and adaptive depending on the number of carriers in congestions. For instance, if there are many carriers in congestions, K can be increased. In the opposite case, it can be decreased to be more aggressive in resetting CW. In the fourth example, the CW is reset to CWmin after the CWmax is used for a certain number of time consecutively.

In the first example, the size of the CW is reset to CWmin if the single backoff channel receives one or more ACKs.

In the second example, the size of the CW is reset to CWmin if the backoff channel and all ancillary carriers have a number of ACKs greater than some threshold. The threshold may be different for ancillary carriers compared to the single backoff channel.

In the third example, the size of the CW is reset to CWmin only if a certain number 'K' of CCs (backoff channel and ancillary channels) have a number of ACKs greater than some threshold. The number of CC can be parameterized and adaptive depending on the number of carriers in congestions. For instance, if there are many carriers in congestions, K can be increased. In the opposite case, it can be decreased to be more aggressive in resetting CW. In the fourth example, the size of the CW is reset to CWmin after the CWmax is used for a certain number of times, consecutively.

Figure 16:
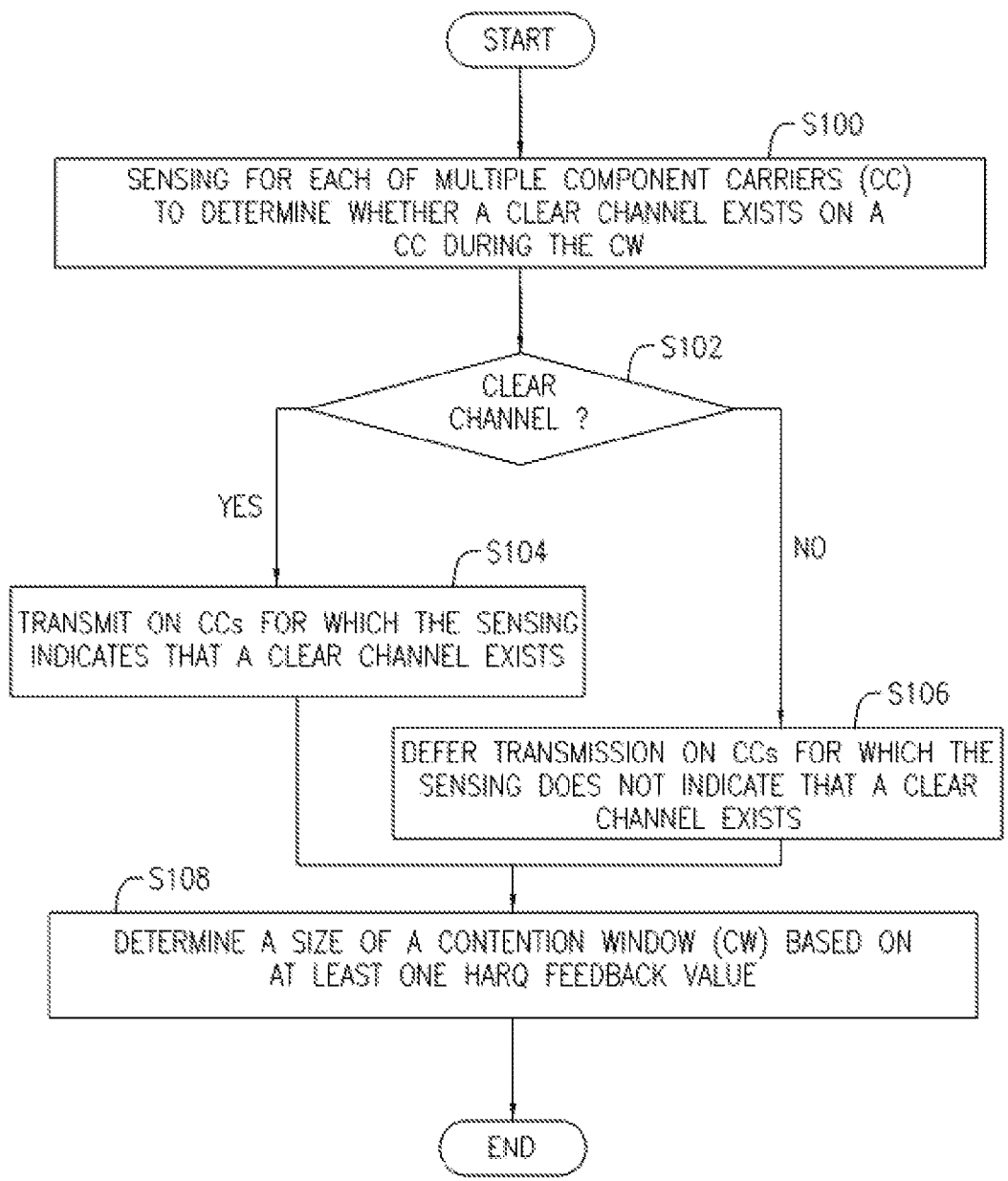
FIG. 16 is a flowchart of an exemplary process for adaptation of contention windows.

FIG. 16 is a flowchart of an exemplary process for adaptation of contention windows in a multicarrier wireless communication system implementing a LBT protocol via the listen before talk unit 28. In some embodiments, a step of the process includes performing sensing via backoff channel sensing unit 32 for each of multiple component carriers, CCs, to determine whether a clear channel exists on a CC during the CW (block S100). If a clear channel exists, (block S102), the process may include transmitting on CCs for which the LBT procedure of the listen before talk unit 28 indicates a clear channel exists (block S104). If a clear channel does not exist, (block S102), the process may also include deferring transmitting via transmission deferral unit 34 on CCs for which the LBT procedure does not indicate that a clear channel exists (block S106). The process also includes determining a size of a contention window (CW) via the contention window size determiner 26 based on at least one Hybrid Automatic Repeat, HARQ, feedback value (block S108).

Further embodiments include:

Embodiment 1

A method of adaptation of contention windows in a multicarrier wireless communication system implementing a listen-before-talk protocol, the method comprising:

sensing for each of multiple component carriers, CCs, to determine whether a clear channel exists on a CC during a backoff period drawn from a contention window, CW (S100);

transmitting on CCs for which the sensing indicates a clear channel exists (S104); and deferring transmitting on CCs for which the sensing does not indicate that a clear channel exists (S106); and determining a size of a CW based on at least one Hybrid Automatic Repeat, HARQ, feedback value (S108).

Embodiment 2

The method of Embodiment 1, wherein the CW is increased if at least one transmission on a CC results in a negative-acknowledgment, NACK, signal.

Embodiment 3

The method of Embodiment 1, wherein the CW is increased only if a ratio of negative acknowledgments, NACKs, to acknowledgements, ACKs, on at least one of a plurality of component carriers exceeds a threshold.

Embodiment 4

The method of Embodiment 1, wherein a rate of increase of the size of the CW is binary.

Embodiment 5

The method of Embodiment 1, wherein a rate of increase of the size of the CW is scaled by a factor greater than 1.

Embodiment 6

The method of Embodiment 1, wherein the backoff period is drawn from a joint contention window, JCW, that is determined from CWs of multiple component carriers.

Embodiment 7

The method of Embodiment 6, wherein the JCW is a maximum of the CWs of the multiple component carriers.

Embodiment 8

The method of Embodiment 6, wherein the JCW is an average of the CWs of the multiple component carriers.

Embodiment 9

An apparatus for adaptation of contention windows in a multicarrier wireless communication system implementing a listen-before-talk protocol, the apparatus comprising:

processing circuitry (21) including:

a processor (22);

a memory (24) in communication with the processor, the memory (24) including executable instructions that, when executed by the processor (22), configure the processor (22) to:

sense for each of multiple component carriers, CCs, to determine whether a clear channel exists on a carrier during a backoff period drawn from a contention window, CW (S100); and determine a size of the CW based on at least one Hybrid Automatic Repeat, HARQ, feedback value; and a transmitter (30) configured to:

transmit on CCs for which the sensing indicates a clear channel exists (S104); and defer transmitting on CCs for which the sensing does not indicate that a clear channel exists (S106).

Embodiment 10

The apparatus of Embodiment 9, wherein the CW is increased if at least one transmission on a CC results in a negative-acknowledgment, NACK, signal.

Embodiment 11

The apparatus of Embodiment 9, wherein the CW is increased only if a ratio of negative acknowledgments, NACKs, to acknowledgements, ACKs, on at least one of a plurality of component carriers exceeds a threshold.

Embodiment 12

The apparatus of Embodiment 9, wherein a rate of increase of the size of the CW is binary.

Embodiment 13

The apparatus of Embodiment 9, wherein a rate of increase of the size of the CW is scaled by a factor greater than 1.

Embodiment 14

The apparatus of Embodiment 9, wherein the backoff period is drawn from a joint contention window, JCW, that is determined from CWs of multiple component carriers.

Embodiment 15

The apparatus of Embodiment 14, wherein the JCW is a maximum of the CWs of the multiple component carriers.

Embodiment 16

The apparatus of Embodiment 14, wherein the JCW is an average of the CWs of the multiple component carriers.

Embodiment 17

An apparatus for adaptation of contention windows in a multicarrier wireless communication system implementing a listen-before-talk protocol, the apparatus comprising:

a listen-before-talk module (44), configured to perform a listen-before-talk, LBT, procedure for each of multiple component carriers, CCs, to determine whether a clear channel exists on a component carrier during a backoff period drawn from a contention window, CW (S100); and a contention window size determination module (42) configured to determine a size of the CW based on at least one Hybrid Automatic Repeat, HARQ, feedback value (S108);

a transmitter module (46) configured to:

transmit on CCs for which the sensing indicates a clear channel exists (S104); and defer transmitting on CCs for which the sensing does not indicate that a clear channel exists (S106).

Embodiment 18

The apparatus of Embodiment 17, wherein the CW is increased if at least one transmission on a CC results in a negative-acknowledgment, NACK, signal.

Embodiment 19

The apparatus of Embodiment 17, wherein the CW is increased only if a ratio of negative acknowledgments, NACKs, to acknowledgements, ACKs, on at least one of a plurality of component carriers exceeds a threshold.

Embodiment 20

The apparatus of Embodiment 17, wherein a rate of increase of the size of the CW is binary.

Embodiment 21

The apparatus of Embodiment 17, wherein a rate of increase of the size of the CW is scaled by a factor greater than 1.

Embodiment 22

The apparatus of Embodiment 17, wherein the backoff period is drawn from a joint contention window, JCW, that is determined from CWs of multiple component carriers.

Embodiment 23

The apparatus of Embodiment 22, wherein the JCW is a maximum of the CWs of the multiple component carriers.

Embodiment 24

The apparatus of Embodiment 22, wherein the JCW is an average of the CWs of the multiple component carriers.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method of adaptation of contention windows in a multicarrier wireless communication system implementing a listen-before-talk protocol, the multicarrier wireless communication system providing multiple secondary cells, SCells, that use multiple component carriers, CCs, the method comprising:
   determining at least one first component carrier, CC, of the multiple CCs to serve as a backoff channel;
   performing a listen-before-talk procedure on the at least one CC serving as a backoff channel, the listen-before-talk procedure including:
      performing sensing for the backoff channel whether a clear channel exists during a backoff period drawn from a contention window, CW;
      before an expected completion of the sensing for the backoff channel, performing a clear channel assessment, CCA, on a plurality of the multiple CCs that do not serve as a backoff channel;
   transmitting on the first CC for which the sensing indicates a clear channel exists;
   transmitting on CCs of the plurality of the multiple CCs for which the CCA indicates a clear channel; and
   determining a size of the CW based on a ratio of a plurality of transmission feedback values associated with the multiple CCs, the ratio corresponding to a ratio of negative acknowledgments, NACKs, to acknowledgements, ACKs.

2. The method of claim 1, wherein
the transmitting on CCs of the plurality of the multiple CCs for which the CCA indicates the clear channel occurring immediately after performing CCA.

3. The method of claim 1, wherein only the first CC serves as a backoff channel.

4. The method of claim 1, wherein the CW is increased only if the ratio of NACKs to ACKs exceeds a threshold.

5. The method of claim 1, wherein the CW is increased only if the ratio of NACKs to ACKs on all backoff channels exceeds a threshold.

6. The method of claim 1, wherein an increase of the size of the CW is obtained by multiplication of a CW by a factor greater than one.

7. The method of claim 1, wherein the backoff period is drawn from a joint contention window, JCW, that is determined from CWs of the multiple component carriers.

8. The method of claim 7, wherein the JCW is a maximum of the CWs of the multiple component carriers.

9. The method of claim 7, wherein the JCW is an average of the CWs of the multiple component carriers.

10. The method of claim 1, further comprising performing a listen-before-talk procedure on at least one CC not serving as a backoff channel.

11. A network node for adaptation of contention windows in a multicarrier wireless communication system implementing a listen-before-talk protocol, the multicarrier wireless communication system providing secondary cells, SCells, that use multiple components carriers, CCs, the network node comprising:
   processing circuitry including:
      a processor;
      a memory in communication with the processor, the memory including executable instructions that, when executed by the processor, configure the processor to:
         determine at least one first component carrier, CC, of the multiple CCs to serve as a backoff channel;
         perform a listen-before-talk procedure on the at least one CC serving as a backoff channel, the listen-before-talk procedure including:
            performing sensing for the backoff channel whether a clear channel exists during a backoff period drawn from a contention window, CW; and
            before an expected completion of the sensing for the backoff channel, performing a clear channel assessment, CCA, on a plurality of the multiple CCs that do not serve as a backoff channel;
         determine a size of CW based on a ratio of a plurality of transmission feedback values associated with the multiple CCs, the ratio corresponding to a ratio of negative acknowledgments, NACKs, to acknowledgements, ACKs; and
      a transmitter configured to transmit on the first CC for which the sensing indicates a clear channel exists and transmit on CCs of the plurality of multiple CCs for which CCA indicates a clear channel.

12. The network node of claim 11, wherein the transmitting on CCs of the plurality of the multiple CCs for which the CCA indicates the clear channel occurs immediately after performing CCA.

13. The network node of claim 11, wherein only the first CC serves as a backoff channel.

14. The network node of claim 11, wherein the CW is increased only if the ratio of NACKs to ACKs exceeds a threshold.

15. The network node of claim 11, wherein the CW is increased only if the ratio of NACKs to ACKs on all backoff channel exceeds a threshold.

16. The network node of claim 11, wherein an increase of the size of the CW is obtained by multiplication of a CW by a factor greater than one.

17. The network node of claim 11, wherein the backoff period is drawn from a joint contention window, JCW, that is determined from CWs of the multiple component carriers.

18. The network node of claim 17, wherein the JCW is a maximum of the CWs of the multiple component carriers.

19. The network node of claim 17, wherein the JCW is an average of the CWs of the multiple component carriers.

20. The network node of claim 11, wherein the memory includes further executable instructions that, when executed by the processor, further configure the processor to perform a listen-before-talk procedure on at least one CC not serving as a backoff channel.

21. A network node for adaptation of contention windows in a multicarrier wireless communication system implementing a listen-before-talk protocol, the multicarrier wireless communication system providing multiple secondary cells, SCells, using multiple component carriers, CCs, the network node comprising:
  a listen-before-talk module, configured to perform a listen-before-talk, LBT, procedure at least one first component carrier, CC, of multiple CCs serving as a backoff channel, the LBT procedure including:
    determining whether a clear channel exists on the backoff channel during a backoff period drawn from a contention window, CW;
    before an expected completion of the determining whether the clear channel exists on the backoff channel, performing a clear channel assessment, CCA, on a plurality of the multiple CCs that do not serve as a backoff channel; and
  a contention window size determination module configured to determine a size of the CW based on a ratio of a plurality of transmission feedback values associated with multiple CCs, the ratio corresponding to a ratio of negative acknowledgments, NACKs, to acknowledgements, ACKs;
  a transmitter module configured to:
    transmit on the first CC for which the determination indicates a clear channel exists; and
    transmit on CCs of the plurality of the multiple CCs for which the CCA indicates a clear channel.

* * * * *